(12) United States Patent
Nakazono et al.

(10) Patent No.: US 8,414,993 B2
(45) Date of Patent: Apr. 9, 2013

(54) ROLL OF CONTINUOUS WEB OF OPTICAL FILM LAMINATE WITH PREDEFINED SLIT LINES, AND METHOD AND SYSTEM FOR MANUFACTURING THE SAME

(75) Inventors: Takuya Nakazono, Osaka (JP); Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/900,150

(22) Filed: Oct. 7, 2010

(65) Prior Publication Data

US 2011/0086193 A1  Apr. 14, 2011

(30) Foreign Application Priority Data

Oct. 13, 2009  (JP) .................. 2009-236092

(51) Int. Cl.
  *B32B 38/04* (2006.01)
  *B32B 3/14* (2006.01)
  *B32B 7/06* (2006.01)
  *B32B 7/12* (2006.01)
  *C09K 19/02* (2006.01)
  *B32B 38/00* (2006.01)
  *B32B 41/00* (2006.01)

(52) U.S. Cl.
  USPC ........ 428/40.1; 428/42.2; 428/42.3; 428/134; 428/136; 428/137; 428/138; 428/906; 349/96

(58) Field of Classification Search .................. None
See application file for complete search history.

(56) References Cited

U.S. PATENT DOCUMENTS

| | | | |
|---|---|---|---|
| 7,022,204 B2 | 4/2006 | Kanbara et al. | |
| 7,543,621 B2 | 6/2009 | Kanbara et al. | |
| 8,259,263 B2 * | 9/2012 | Kimura et al. | ................. 349/96 |
| 2004/0095526 A1 | 5/2004 | Yamabuchi et al. | |
| 2004/0134231 A1 | 7/2004 | Oya | |
| 2004/0169809 A1 | 9/2004 | Yamabuchi et al. | |
| 2005/0016670 A1 * | 1/2005 | Kanbara et al. | ............... 156/257 |
| 2005/0199337 A1 | 9/2005 | Nishikubo et al. | |

(Continued)

FOREIGN PATENT DOCUMENTS

| | | |
|---|---|---|
| CN | 1470890 | 1/2004 |
| CN | 1576828 | 2/2005 |

(Continued)

OTHER PUBLICATIONS

English Abstract for JP 57052017 A, Mar. 1982.*

(Continued)

*Primary Examiner* — David Sample
*Assistant Examiner* — Jeff Vonch
(74) *Attorney, Agent, or Firm* — Lowe Hauptman Ham & Berner, LLP

(57) ABSTRACT

A roll of a continuous web of an optical film laminate with predefined slit lines for use in a continuous manufacturing system by laminating optically functional film sheets to liquid-crystal panels. The optical film laminate with predefined slit lines comprises an optically functional film having an adhesive layer which is subjected to a preliminary inspection, and a carrier film releasably laminated to the adhesive layer. Defect-free normal sheets and defective or defect-containing sheets having predefined length corresponding to the dimension of the liquid-crystal panel are formed on the carrier film by sequentially forming slit lines along the transverse direction with respect to the lengthwise direction of the optical film laminate.

3 Claims, 19 Drawing Sheets

U.S. PATENT DOCUMENTS

| | | |
|---|---|---|
| 2006/0124248 A1 | 6/2006 | Kanbara et al. |
| 2007/0013858 A1 | 1/2007 | Yamabuchi et al. |
| 2009/0159175 A1 | 6/2009 | Nakahira et al. |
| 2009/0199950 A1* | 8/2009 | Kitada et al. .................... 156/64 |
| 2009/0218049 A1 | 9/2009 | Kanbara et al. |

FOREIGN PATENT DOCUMENTS

| | | |
|---|---|---|
| CN | 101528445 | 9/2009 |
| EP | 2093041 | 8/2009 |
| JP | 55-120005 | 9/1980 |
| JP | 57-052017 | 3/1982 |
| JP | 57052017 A * | 3/1982 |
| JP | 11-095028 | 4/1999 |
| JP | 2002-023151 | 1/2002 |
| JP | 2003-161935 | 6/2003 |
| JP | 2003-202298 | 7/2003 |
| JP | 2003202298 A * | 7/2003 |
| JP | 2003-344302 | 12/2003 |
| JP | 2004-144913 | 5/2004 |
| JP | 2004-361741 | 12/2004 |
| JP | 2005-062165 | 3/2005 |
| JP | 2005-114624 | 4/2005 |
| JP | 2005-298208 | 10/2005 |
| JP | 2006-058411 | 3/2006 |
| JP | 2007-064989 | 3/2007 |
| JP | 2007-140046 | 6/2007 |
| JP | 2009-061498 | 3/2009 |
| KR | 2003-0042760 | 6/2003 |
| TW | 200305545 | 11/2003 |
| WO | 2007/058023 | 5/2007 |
| WO | WO 2008047712 A1 * | 4/2008 |
| WO | 2009/123002 | 10/2009 |

OTHER PUBLICATIONS

Machine Translation of JP 2003202298 A, Jul. 2003.*
Full English Translation of JP 57-052017 A, Mar. 1982.*
Taiwanese office action dated Apr. 21, 2011 for application No. 099129095.
Korean Notice of Allowance for 10-2010-0052552.
European Search Report for 10177673.
Chinese Office Action for 201010229436 dated Mar. 20, 2012.
Chinese Office Action for 201010229436 dated Dec. 4, 2012.

* cited by examiner

FIG.19

| inspection unit | type of defect | | | | |
| --- | --- | --- | --- | --- | --- |
| | internal foreign substances | internal pores | bright spots | surface irregularities | flaw/undulation |
| reflection | △ | △ | × | ○ | ○ |
| transmission | ○ | ○ | △ | △ | × |
| detect defects by cross-Nichol condition | ○ | ○ | ○ | × | ○ |

ROLL OF CONTINUOUS WEB OF OPTICAL FILM LAMINATE WITH PREDEFINED SLIT LINES, AND METHOD AND SYSTEM FOR MANUFACTURING THE SAME

CROSS-REFERENCE TO RELATED APPLICATIONS

The present application claims priority to Japanese patent application number 2009-236092, filed on Oct. 13, 2009, which is incorporated by reference in its entirety.

TECHNICAL FIELD

The present invention relates to a roll of a continuous web of an optical film laminate with predefined slit lines and method and system for manufacturing the same, the optical film laminate being adapted for use in a system for sequentially manufacturing LCD (Liquid-Crystal Display).

BACKGROUND ART

For a liquid-crystal display element to function, the direction of orientation of liquid-crystal molecules and the direction of polarization of the polarizer are closely related each other. In liquid-crystal display element technologies, LCDs using a TN (Twisted Nematic) type liquid-crystal has first been put into practical use, and then LCDs using a VA (vertical Alignment) type liquid-crystal, an IPS (Inplane Switching) type liquid-crystal etc., have been put into practical use. Although a technical explanation is omitted, in an LCD using such TN-type liquid-crystal panel, liquid-crystal molecules are provided between two upper and lower orientation films having respective rubbing directions on the inner surfaces of glass substrates of the liquid-crystal panel. This means that the liquid-crystal molecules are twisted by 90 degrees along the optical axis, so that when a voltage is applied, the liquid-crystal molecules are aligned in a direction perpendicular to the orientation of films. However, in the case where the LCD is designed to allow images as seen from right and left sides of a display screen as those view directly in front of the display screen, the direction of rubbing on the orientation film at the viewing-side must be 45 degrees (the rubbing direction of the other orientation film is 135 degrees). It is therefore necessary that polarizing sheets made from polarizing composite films to be laminated respectively on the front and back sides of the liquid-crystal panel must have polarizers respectively oriented in directions inclined by 45 degrees with respect to a lengthwise or widthwise direction of the display screen so as to conform to the rubbing directions.

Therefore, in a polarizing sheet for use in producing a liquid-crystal display element of a TN-type liquid-crystal panel, it is required that a optical film laminate is punched or cut into a rectangular-shaped sheet having a long side or a short side determined in accordance with the size of the TN liquid-crystal panel, in such a manner that the long or short side inclined by 45 degrees with respect to the orientation direction of the polarizer produced by stretching in the lengthwise or widthwise direction of a polarizer base film (i.e., with respect to the feed direction of the optical film laminate prior to the punching or cutting process). This is described in Japanese Laid-Open Patent Publication JP 2003-161935A (Patent Document 1) or Japanese Patent 3616866 B (Patent Document 2), for example. The optical film sheet of such rectangular shape has a width or a short side dimension which is smaller than the width of the optical film laminate.

The rectangular-shaped sheets punched or cut from the optical film laminate may be collectively referred as "individualized sheets."

In producing a liquid-crystal display element using such individualized sheets, each of the individualized sheets is punched or cut in advance with a separator adhered to an adhesive layer. The shaped individualized sheets are stored in a magazine in a liquid-crystal display element production process. The individualized sheets stored in the magazine are taken out and conveyed one-by-one by means of a suction conveyance unit to the lamination position with the liquid-crystal panel W. Before being laminated to the liquid-crystal panel W, the separator releasably laminated to a formed adhesive layer is peeled from respective ones of the individualized sheets, and each of the individualized sheets is laminated to the liquid-crystal panel W via as such exposed adhesive layer. As the individualized sheets are flexible, they tend to be bowed or warped on their edges, and thus it is a serious technical impediment in lamination with liquid-crystal panels. Thus, in producing a liquid-crystal display element using individualized sheets, it has been required to adopt individualized sheets having four trimmed sides and a certain level of stiffness for less deflection or bend and which can be conveyed and laminated easily, to facilitate peeling respective ones of separators one-by-one and an accurate and swift positioning and laminating respective ones of the individualized sheets with liquid-crystal panels. For this reason, the individualized sheets have been laminated with a protective film, for example, of 40 to 80 μm thick not only to one surface but also to both surfaces of a polarizer to have stiffness induced by a thickness. During the initial period in the history of the manufacturing process of the liquid-crystal display elements, the optical film sheet or a polarizing sheet comprised in such optical film sheet was generally known as "polarizing plate" which is still used as a common name.

In the manufacturing process of TN-type liquid-crystal display elements, it is impossible to obtain a finished liquid-crystal display element simply by sequentially laminating the sheets formed in the sequential punching or cutting process to respective ones of a plurality of liquid-crystal panels. This is because the sheet of the optical film laminate is cut from the web in such a manner that the sheet has a long or short side extending in a direction 45 degrees with respect to the orientation direction of the polarizer produced by stretching in a lengthwise or widthwise direction of the polarizer base film (i.e., with respect to the feed direction of the optical film laminate prior to the punching or cutting process), so that the sheet cannot be laminated sequentially to respective ones of the liquid-crystal panels with the orientation as it has been cut from the web. Therefore, to laminate the sheets to the liquid-crystal panel, each of the sheets need to be punched-out at an angled direction of 45 degrees from the continuous web of the optical film laminate having a width greater than a long side of the liquid-crystal panel with respect to the lengthwise direction of the optical film laminate, using, for example, a die, and fed to the lamination station where the polarizing sheets are laminated with the liquid-crystal panels, as seen in the Patent Document 1 or 2. Alternatively, the optical film laminate in use needs to be an elongated optical film punched or cut from the continuous web of the optical film laminate having a substantially large width in a direction 45 degrees inclined with respect to the lengthwise direction, or an elongated optical film formed with a plurality of formed sheets connected into a continuous film configuration. At any rate, the above methods do not provide any noticeable improvement over the method of using individualized sheets.

The Patent Document 3 is a Japanese Patent Publication No. 62-14810B which discloses, prior to the VA-type liquid-crystal and the IPS-type liquid-crystal are brought into practical use, an apparatus to produce a liquid-crystal panel element. According to the method disclosed by the Patent Document 3, a technique of continuously feeding out an optical film laminate is provided. The continuous optical film laminate comprises a polarizing composite film of substantial length (in the Patent Document 3, referred to as "elongated polarizing plate") and a separator for protecting an adhesive layer provided on one side of the polarizing composite film and supplied in the form of a roll. The continuous optical film laminate is then unrolled from the roll of the film laminate and subjected to a process of "slitting only the polarizing plate 4 and the adhesive layer 5 while leaving the separator 6 uncut (hereinafter referred to as "half-cut")" to thereby form polarizing sheets of desired dimensions. If it is found that anyone of the polarizing sheets contain a defect or defects, such defective or defect-containing polarizing sheet is removed from the process line in the course of the feeding. The polarizing film having no defect or defects are then peeled off the separator and sequentially laminated the liquid-crystal panels (in the Patent Document 3, referred to as "liquid-crystal cells"). It is interpreted that the method is proposed specifically for constituting small-size display screens for use with electronic calculators or the like. The apparatus is considered to be a type of labeler unit which produces an LCD using the TN-type liquid-crystal. There is taught to produce the optical film in the form of an elongated sheet, and for the purpose, an optical film laminate having substantially large width is provided and slit in a direction 45 degrees oblique to the lengthwise direction of the optical film laminate with a width corresponding to the width of the liquid-crystal pane. Alternatively, a film-like elongated optical film sheet may be formed by connecting a plurality of optical film sheets. Therefore, the method taught by the Patent Document 3 cannot be applied directly to a manufacturing process adapted to perform steps of continuously forming a plurality of polarizing sheets from an optical film laminate and laminating the respective sheets to respective ones of the liquid-crystal panels comprising VA-type or IPS-type liquid-crystal to produce liquid-crystal display elements.

The Patent Document 4 is a Japanese Patent Publication No. 55-120005B which discloses, prior to the VA-type liquid-crystal and the IPS-type liquid-crystal are brought into practical use, an apparatus to produce a liquid-crystal display element. The manufacturing method of an optical film laminate to be used in such apparatus is as follows. First, an adhesive layer is formed on a large-width polarizing composite film. A plurality of elongated polarizing composite film sheets having a required width are then provided by cutting the large-width polarizing composite film. These sheets are then applied to a separately prepared conveyance medium (i.e., a carrier film) which has preliminarily been subjected to a releasing treatment to produce an optical film laminate. Then, the optical film laminate is subject to a half-cut process in a transverse direction by means of two knives which are spaced apart by a required distance in the lengthwise direction, leaving the conveyance medium uncut. Thus the optical film laminate is sequentially cut into a plurality of sheets on the conveyance medium. Finally, the plurality of formed sheets are sequentially laminated to respective ones of the liquid-crystal panels being conveyed to manufacture the liquid-crystal display element. This apparatus is also based on the use of an elongated polarizing sheet which is cut in a direction 45 degrees oblique to the stretching direction of the polarizing composite film with a width corresponding to the width of the liquid-crystal panel. Therefore, the technology disclosed by the Patent Document 4 cannot be applied directly to a manufacturing apparatus adapted to VA-type or IPS-type liquid-crystal to produce liquid-crystal display elements.

Automation of manufacturing process for liquid-crystal display elements using individualized sheets is disclosed, for example, in the Japanese Patent Publication No. 2002-23151A (Patent Document 5). Flexible individualized sheets tend to be bowed or warped due to curves or distortion of its edge, and thus it is a serious technical impediment to accuracy and speed in registration and lamination with liquid-crystal panels. Thus, it will be understood that the individualized sheet is required to have a certain level of thickness and stiffness to facilitate registration and lamination with liquid-crystal panels typically in transportation under suction. For example, the disclosures in the Japanese Laid-Open Patent Publication No. 2004-144913A (Patent Document 6), Japanese Laid-Open Patent Publication No. 2005-298208A (Patent Document 7) or Japanese Laid-Open Patent Publication No. 2006-58411A (Patent Document 8) disclose measures for addressing such technical problems.

In contrast to TN-type liquid-crystal panels, the VA-type and IPS-type liquid-crystal panels are not designed to arrange liquid-crystal molecules in twisted orientations. Thus, in the case of the liquid-crystal display element using these types of liquid-crystal panels, there is no need to have the polarization axis of the polarizing sheet oriented at 45 degrees in view of viewing angle characteristics inherent to the orientation of the liquid-crystal. Each of these liquid-crystal display elements using these liquid-crystal panels is formed by applying the polarizing sheets to the opposite sides of the liquid-crystal display panel oriented with their polarization axes crossed at 90 degrees crossing angle. In the case of the VA-type and IPS-type liquid-crystal panels, with respect to the technical view point of symmetry of the viewing angle characteristics and visibility, maximum contrast can be obtained along the direction of the polarizing axis of the polarizing sheet, so that it is preferable that the sheets have polarizing axes oriented in parallel with the lengthwise or transverse direction of the liquid-crystal panel. Thus, it will be understood that these sheets to be applied to the liquid-crystal panel has a feature that the continuous web of the optical film laminate including a polarizing composite film which has been subjected to a lengthwise or transverse stretching can be continuously fed out from a roll and cut along transverse lines with respect to the lengthwise direction of the web of the optical film laminate to sequentially produce rectangular polarizing sheets including the polarizing sheets having the same width as the web of the optical film laminate width.

Because of the improved viewing angle characteristics, for liquid-crystal used in a display element for widescreen televisions, the VA-type liquid-crystal or the IPS-type liquid-crystal are more widely adopted than the TN type. In view of such trend in environments of technical developments, proposals to enhance the manufacturing efficiency using these types of liquid-crystal panels has been made such as the one described in Japanese Laid-Open Patent Publication No. 2004-361741A (Patent Document 9). This patent discloses steps of continuously feeding a continuous optical film laminate, cutting the continuous optical film laminate in conformity to the size of a liquid-crystal panel and sequentially laminating a plurality of optical film sheets which have been produced by the cutting step to respective ones of a plurality of the liquid-crystal panels.

However, the mainstream of manufacture of liquid-crystal display elements is still based on the manufacturing technology utilizing individualized sheets, due to the following technical problems. In manufacturing liquid-crystal display elements, a critical technical challenge is to detect any defect which may otherwise be retained in the display elements to be formed, and to prevent any defective product from being produced. Most of the product defects primarily arise from defects in the polarizing composite film contained in the continuous optical film laminate. However, it is not practical to provide an continuous optical film laminate after completely removing all defects contained in individual films which are to be laminated together to form the optical film laminate, because it is extremely difficult to produce a defect-free continuous optical film laminate under existing circumstances. To maintain quality of display elements, it is not permitted to use a polarizing composite film sheet having visible flaws or defects for a sheet for television display element even if such a flaw or defect is small. Given that the long side dimension of a polarizing sheet formed from the polarizing composite film is about 1 m, if a defective region cannot be preliminarily removed, 20 to 200 defective liquid-crystal display elements out of 1,000 products will be produced.

Proposals relating to preliminary inspection apparatus for a polarizing composite film have previously been made, as disclosed, for example, in Japanese Patent No. 3974400B (Patent Document 10), Japanese Laid-Open Patent Publications 2005-62165A (Patent Document 11) and 2007-64989A (Patent Document 12) for improving the production efficiency of manufacturing the individualized sheets. These proposals have disclosed technical means essential to improving yield in the manufacture of such individualized sheets.

Further, Japanese Laid-Open Patent Publications 2007-140046A (Patent Document 13) discloses a method comprising the steps of exposing a polarizing composite film having an adhesive layer by peeling a carrier film included in the continuous optical film laminate continuously fed out from a roll of continuous optical film laminate, detecting a defect or defects present in the polarizing composite film, punching only normal regions of the polarizing composite film in rectangular shape, appropriately avoiding defective regions, and conveying the punched normal polarizing sheets to the lamination position with the liquid-crystal panels by other conveying medium. It should however be noted that this process is not the one which makes it possible to feed the normal optical film sheets formed from a continuous optical film laminate to the lamination position with the liquid-crystal panel by means of the carrier film. This technique is a method for once laminating the cut individualized sheets to other conveying medium before conveying to the lamination position with the liquid-crystal panels, so this technique is not beyond the individualized sheet manufacturing system of liquid-crystal display element.

Japanese Laid-Open Patent Publications 2009-061498A (Patent Document 14) discloses a method for laminating the sheets of the optical film with the liquid-crystal panels and an apparatus therefor. This invention contains an innovative proposal allowing for shifting from a liquid-crystal display element manufacturing system designed to carry a plurality of preliminary formed individualized sheets in the manufacturing process of the liquid-crystal display element, and laminate the individualized sheets one by one to respective ones of a plurality of liquid-crystal panels, to a continuous manufacturing system for liquid-crystal display element designed to continuously form a plurality of optical film sheets and directly laminate the formed sheets to respective ones of a plurality of liquid-crystal panels.

However, the method and system disclosed cause not only substantial complexity in the entire system for laminating but also an increase in the number of steps and difficulty in control for each step, and thus causes reduction in the manufacturing speed.

The present invention has been made based on the aforementioned prior proposals and through intensive researches and considerations for enabling a sequential manufacturing of liquid-crystal display elements and significantly enhancing product accuracy and manufacturing speed, and drastically improving manufacturing yield, in the manufacture of liquid-crystal display elements.

The prior art documents referred to in the above descriptions are listed below.

Patent Document 1: Japanese Laid-Open Patent Publication 2003-161935A
Patent Document 2: Japanese Patent No. 3616866B
Patent Document 3: Japanese Patent Publication 62-14810B
Patent Document 4: Japanese Laid-Open Patent Publication 55-120005A
Patent Document 5: Japanese Laid-Open Patent Publication 2002-23151A
Patent Document 6: Japanese Laid-Open Patent Publication 2004-144913A
Patent Document 7: Japanese Laid-Open Patent Publication 2005-298208A
Patent Document 8: Japanese Laid-Open Patent Publication 2006-58411A
Patent Document 9: Japanese Laid-Open Patent Publication 2004-361741A
Patent Document 10: Japanese Patent No. 3974400B
Patent Document 11: Japanese Laid-Open Patent Publication 2005-62165A
Patent Document 12: Japanese Laid-Open Patent Publication 2007-64989A
Patent Document 13: Japanese Laid-Open Patent Publication 2007-140046A
Patent Document 14: Japanese Laid-Open Patent Publication 2009-061498A

DISCLOSURE OF THE INVENTION

[Problem to be Solved by the Invention]

The VA-type and IPS-type liquid-crystal panels are advantageous over TN-type liquid-crystal panels from the viewpoint of manufacture in that there is no restriction in the VA and IPS-types that two polarizing sheets are required to be laminated to respective ones of front and rear surfaces of the liquid-crystal panel in 45 degrees oblique with respect to the polarization axis of the polarizing sheet on the respective sides of the liquid-crystal display element, as experienced in the manufacture of TN-type liquid-crystal panels, due to the viewing angle characteristics inherent to the orientation of the liquid-crystal. Therefore, it is possible to carry out a process for continuously manufacturing liquid-crystal display elements using the VA-type and IPS-type liquid-crystal panels, while feeding a continuous optical film laminate, by continuously laminating the polarizing composite film sheets prepared by cutting the optical film laminate in the transverse direction with respect to the lengthwise direction of the optical film laminate with the respective ones of a plurality of the liquid-crystal panels. In addition, during the feed of the optical film, if normal polarizing sheets having no defect and defective polarizing sheets having defects detected by the preliminary inspection of a continuous polarizing composite film are being cut out, and if only the normal polarizing sheets are laminated to respective ones of a plurality of liquid-crystal panels to make liquid-crystal display elements, without interrupting the feed of the optical film laminate, it becomes possible to obtain enhanced product accuracy and manufacturing speed as well as significantly improved production yield in the manufacture of liquid-crystal display elements.

It is therefore an object of the present invention to provide a method and system for continuously laminating only the normal polarizing sheets to the respective ones of a plurality of the liquid-crystal panels by continuously cutting out each of defective polarizing sheets having defects detected by a preliminary inspection and normal polarizing sheets having no defect, while feeding an inspected continuous optical film laminate (hereinafter referred to as "inspected continuous optical film laminate") comprising a continuous polarizing composite film with an adhesive layer and a continuous carrier film releasably laminated to the adhesive layer to the lamination position without interrupting the feed of the inspected continuous optical film laminate, and thereby obtaining enhanced product accuracy and manufacturing speed as well as significantly improved production yield in the manufacture of liquid-crystal display elements.

[Means for Solving the Problem]

According to one aspect of the present invention, there is provided a roll of a continuous web of an optical film laminate with predefined slit lines adapted for use in a system for sequentially manufacturing liquid-crystal display elements by laminating optically functional film sheets to respective ones of liquid-crystal panels, the optically functional film sheets being formed to have a predefined dimension corresponding to a dimension of a liquid-crystal panel having a predefined size. The optical film laminate comprises (1) an optically functional film with an adhesive layer, including at least one defect-free normal sheet having no defect and at least one defective or defect-containing sheet having at least one defect, the at least one defect-free normal sheet and the at least one defective sheet being defined between two longitudinally adjacent ones of predefined slit lines based on a preliminary inspection and having the predefined dimension, and (2) a carrier film releasably laminated on the adhesive layer. The slit lines are sequentially formed in a transverse direction of the optical film laminate at a side opposite to the carrier film to a depth reaching a surface of the carrier film adjacent to the adhesive layer. The defect-free normal sheet and defective or defect-containing sheet being identifiable in the system for sequentially manufacturing liquid-crystal display elements by identification means generated based on a position or positions of defect or defects detected by the preliminary inspection.

According to one embodiment of the present invention, the identification means is at least one mark provided at the positions of defects in the optical film laminate detected by the preliminary inspection. In another embodiment of the present invention, the identification means is identification information configured to indicate that a sheet is a defective polarizing sheet when at least one defect exists in the sheet between two consecutive slit lines, based on positions of defects detected by the preliminary inspection and positions of slit lines.

According to a second aspect of the present invention, there is provided a method for manufacturing a continuous web of an optical film laminate with predefined slit lines adapted for use in a system for sequentially manufacturing liquid-crystal display elements by laminating optically functional film sheets to respective ones of liquid-crystal panels, said optically functional film being formed to have a predefined dimension corresponding to a dimension of a liquid-crystal panel having a predefined size. In this method, an optically functional film is generated by laminating a continuous web of a protective film on at least one of opposite surfaces of a continuous web of a polarizer. The method further comprises steps of inspecting surfaces and inside of the optically functional film to detect position of any defect existing in the optically functional film, and releasably laminating a continuous web of a carrier film on the continuous web of the inspected optically functional film through an adhesive layer to form a continuous web of the optical film laminate. The method further comprises a step of sequentially forming slit lines in a transverse direction of the optical film laminate at a side opposite to the carrier film to a depth reaching a surface of the carrier film adjacent to the adhesive layer, to form, on the carrier film, at least one defect-free normal sheet having no defect and at least one defective or defect-containing sheet having at least one defect, the at least one defect-free normal sheet and the at least one defective sheet having the predefined dimension corresponding to a dimension of the liquid-crystal panel. The method further comprises a step of generating identification means for allowing identification of the normal sheets and the defective sheets in the system for sequentially manufacturing liquid-crystal display elements based on the positions of defects detected by the preliminary inspection. Finally, the generated continuous web of an optical film laminate is wound to form a roll.

According to a third aspect of the present invention, there is provided another method for manufacturing a continuous web of an optical film laminate with predefined slit lines adapted for use in a system for sequentially manufacturing liquid-crystal display elements. In the method, at first, there is prepared a roll of a continuous web of a provisional optical film laminate at least including a continuous web of an optically functional film and a continuous web of a provisional carrier film, the continuous web of the optically functional film including a laminated web comprising a continuous web of a polarizer, a protective film laminated on at least one of opposite surfaces of the continuous web of polarizer and an adhesive layer provided on one of opposite surfaces of the laminated web, the continuous web of the provisional carrier film being releasably laminated on the adhesive layer. The method comprises steps of peeling the provisional carrier film from the provisional optical film laminate while feeding the provisional optical film laminate from a roll of the provisional optical film laminate, to expose the adhesive layer of the optically functional film, inspecting surfaces and inside of the optically functional film with the adhesive layer in the exposed state to detect position of any defect existing in the optically functional film, and releasably laminating a continuous web of a carrier film on the continuous web of the inspected optically functional film through the adhesive layer to form a continuous web of the optical film laminate. The method further comprises a step of sequentially forming slit lines in a transverse direction of the optical film laminate at a side opposite to the carrier film to a depth reaching a surface of the carrier film adjacent to the adhesive layer, to form, on the carrier film, at least one defect-free normal sheet having no defect and at least one defective sheet having at least one defect, the at least one defect-free normal sheet and the at least one defective sheet having the predefined dimension corresponding to a dimension of the liquid-crystal panel. The method further comprises a step of generating identification means for allowing identification of the normal sheets and the defective sheets in the system for continuously manufacturing liquid-crystal display elements based on the positions of defects detected by the preliminary inspection. Finally, the generated continuous web of an optical film laminate is wound to form a roll.

According to one embodiment of the second and the third aspects of the present invention, the step of generating identification means comprises a step of providing a mark indicating a position of a defect detected by the preliminary inspection to the optical film laminate. In another embodiment of the second and the third aspects of the present invention, the step of generating identification means comprises a step of generating identification information configured to indicate that a sheet is a defective sheet when at least one defect exists in the sheet between two consecutive slit lines, based on positions of defects detected by the preliminary inspection and positions of slit lines.

According to a fourth aspect of the present invention, there is provided an apparatus for producing a roll of a continuous web of an optical film laminate with predefined slit lines adapted for use in a system for sequentially manufacturing liquid-crystal display elements by laminating optically functional film sheets to respective ones of liquid-crystal panels, the optically functional film sheets being formed to have a predefined dimension corresponding to a dimension of a liquid-crystal panel having a predefined size. The apparatus comprises an optically functional film forming unit for laminating a continuous web of a protective film on at least one of opposite surfaces of a continuous web of a polarizer to form an optically functional film, an inspection unit for inspecting surfaces and inside of the optically functional film to detect position of a defect existing in the optically functional film, and an optical film laminate forming unit for releasably laminating a continuous web of a carrier film on the continuous web of the optically functional film through an adhesive layer to form a continuous web of the optical film laminate. The apparatus further comprises a slitting unit for sequentially forming slit lines in a transverse direction of the optical film laminate for separating at least one normal sheet having no defect and a predetermined length corresponding to a dimension of a liquid-crystal panel having a predefined size and at least one detective sheet having at least one defect on the carrier film, the slit lines being sequentially formed in a transverse direction with respect to the lengthwise direction of the optical film laminate at a side opposite to said carrier film to a depth reaching a surface of the carrier film adjacent to the adhesive layer. The apparatus further comprises identification means generating unit for generating identification means to allow identification of a normal sheet and a defective sheet in an system for sequentially manufacturing liquid-crystal display elements, based on positions of defects detected by the preliminary inspection. The apparatus further comprises a winding unit for winding a manufactured continuous web of an optical film laminate with predefined slit lines to form a roll.

According to a fifth aspect of the present invention, there is provided another apparatus for producing a roll of continuous web of an optical film laminate with predefined slit lines. The apparatus comprises a provisional optical film laminate feeding unit for feeding a provisional optical film laminate from the roll of the provisional optical film laminate, the provisional optical film laminate at least including a continuous web of an optically functional film and a continuous web of a provisional carrier film, the continuous web of the optically functional film including a laminated web having a continuous web of a polarizer, a protective film laminated on at least one of opposite surfaces of the continuous web of the polarizer and an adhesive layer on one of opposite surfaces of the laminated web, the continuous web of the provisional carrier film being releasably laminating on the adhesive layer. The apparatus further comprises a provisional carrier film peeling unit for peeling the provisional carrier film from the provisional optical film laminate to expose the adhesive layer of the optically functional film, an inspection unit for inspecting surfaces and inside of the optically functional film with the adhesive layer in the exposed state to detect position of a defect existing in the optically functional film, and an optical film laminate forming unit adapted to releasably laminate a continuous web of a carrier film on the continuous web of the optically functional film through an adhesive layer of the inspected optically functional film comprising the adhesive layer to form a continuous web of the optical film laminate. The apparatus further comprises a slitting unit for sequentially forming slit lines in a transverse direction of the optical film laminate for separating at least one normal sheet having no defect and a predetermined length corresponding to a dimension of a liquid-crystal panel having a predefined size, and at least one detective sheet having at least one defect on the carrier film, the slit lines being sequentially formed in a transverse direction with respect to the lengthwise direction of the optical film laminate at a side opposite to said carrier film to a depth reaching a surface of the carrier film adjacent to the adhesive layer. The apparatus further comprises identification means generating unit for generating identification means to allow identification of a normal sheet and a defective sheet in an system for sequentially manufacturing liquid-crystal display elements, based on positions of defects detected by the preliminary inspection. The apparatus further comprises a winding unit for winding a manufactured continuous web of an optical film laminate with predefined slit lines to form a roll.

According to one embodiment of the fourth and the fifth aspect of the present invention, identification means generating unit is a marking unit for providing a mark indicating positions of defects detected by the preliminary inspection. In another embodiment of the fourth and the fifth aspect of the present invention, the identification means generating unit comprises identification information generating unit to generate identification information configured to indicate that a sheet is a defective sheet when at least one defect exists in the sheet between two consecutive slit lines, based on positions of defects detected by the preliminary inspection and positions of slit lines.

BRIEF DESCRIPTION OF THE DRAWINGS

FIG. 19 is a table showing a defect inspection unit, types of defect and a defect detection method, according to one embodiment of the present invention.

BEST MODE FOR CARRYING OUT THE INVENTION

In this specification, a film on which an adhesive layer is formed on one surface to be laminated with a liquid-crystal panel of a polarizer laminated with a protective film on one or both surfaces is referred as "a polarizing composite film," and sheets rectangularly shaped from the polarizing composite film, are referred as "a polarizing composite film sheet" or simply "a sheet," rather than the commonly called name "polarizing plate." In addition, when a sheet is formed from an optical film including a polarizing composite film having a surface-protection film and a carrier film attached thereto, and when this sheet has to be distinguished from "a polarizing composite film sheet", it is referred as "an optical film sheet", and a sheet formed from the surface-protection film or the carrier film included in the polarizing composite film is respectively referred as "a surface-protection film sheet" or "a carrier film sheet" respectively.

The present invention will now be described with reference to specific embodiments illustrated in the accompanying drawings.

Figure 3:
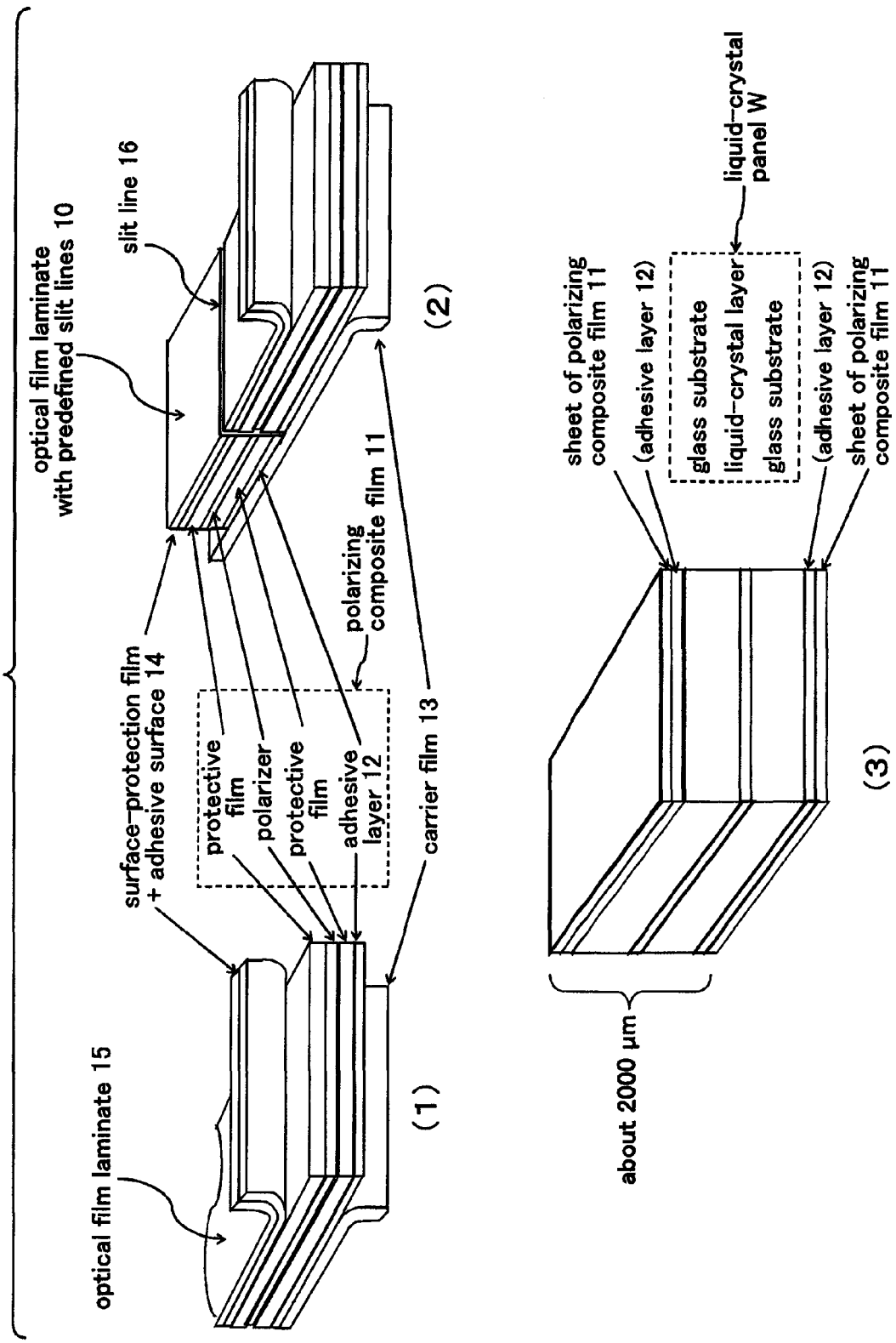
FIG. 3 is a schematic diagram showing the structure of a continuous web of an optical film laminate with predefined slit lines, according to one embodiment of the present invention.

1. Configuration of Continuous Web of Optical Film Laminate with Predefined Slit Lines FIG. 3(1) shows in fragmentary perspective view a continuous web of an optical film laminate 15 and FIG. 3(2) shows a continuous web of an optical film laminate with predefined slit lines 10 according to one embodiment of the present invention. The continuous web of an optical film laminate with predefined slit lines 10 is formed by sequentially forming slit lines 16 in a transverse direction with respect to the lengthwise direction of the continuous web of the optical film laminate 15. Sheets of an optically functional film 11 (corresponds to a polarizing composite film 11 in FIG. 3. Hereinafter, the optically functional film is referred as "a polarizing composite film" except unless necessary to distinguish from others) are formed in separated-state on a carrier film 13 by the slit lines 16. Among a plurality of sheets sequentially formed in separated-state on the carrier film 13 by two consecutive slit lines 16, the sheets of the polarizing composite film 11 to be laminated with the liquid-crystal panel W are those without defects of the polarizing composite film. The interval of the two consecutive slit lines 16 is equivalent to a predefined length corresponding to a size of the liquid-crystal panel W. FIG. 3 (3) shows a liquid-crystal display element manufactured by laminating the above mentioned sheet to a liquid-crystal panel.

The optical film laminate with predefined slit lines 10 is a laminate generated by sequentially forming the slit lines 16 on a continuous web of an optical film laminate 15 comprising the polarizing composite film 11 including the adhesive layer 12, the carrier film 13 releasably laminated with the adhesive layer 12, and the surface-protection film 14 releasably laminated with the surface of the polarizing composite film on the opposite surface which the carrier film is laminated thereto. On the carrier film 13 of the optical film laminate with predefined slit lines 10, sheets of the polarizing composite film 11 and sheets of the surface-protection film 14 are form in separated-state by the slit lines.

The polarizing composite film 11 generally comprises a continuous web of the polarizer having transparent protective films respectively laminated on the opposite surfaces of the continuous web of the polarizer, and an acrylic adhesive layer 12 formed on the protective film on the side of the polarizer which is to be laminated with the liquid-crystal panel W. The carrier film 13 is releasably laminated to the adhesive layer 12 for protecting the exposed side of the exposed adhesive layer 12 of the polarizing composite film 11. The optically functional film 11 is formed through the following process, for example. First, a PVA (polyvinyl alcohol)-based film having a thickness of about 50 to 80 μm is subjected to a dyeing treatment using iodine and a cross-linking treatment; and then subjecting the resultant PVA-based film to an orientation treatment which is carried out by stretching the film in a lengthwise or widthwise direction thereof. As a result, the iodine complex is oriented in the direction parallel to the stretching direction of the PVA-based film to acquire a property of absorbing a polarized light having a plane of oscillation matching with the orientation of the iodine complex to thereby provide a polarizer having absorption axes in the direction parallel to the stretching direction. In order to produce a continuous web of a polarizer having an excellent optical property in addition to excellent uniformity and accuracy, it is desirable that the stretching direction of the PVA-based film corresponds to the lengthwise or widthwise directions of the film. Generally, the absorption axis of the polarizer or the optically functional film including such polarizer is parallel to the lengthwise direction of the optically functional film, and the polarizing axis is in the widthwise direction perpendicular to the absorption axis. The thickness of the polarizer is 20 to 30 μm. Then, the protective film for protection of the polarizer is laminated to each of the opposite surfaces of the formed continuous web of the polarizer with an adhesive. Generally, a transparent TAC (triacetylcellulose)-based film having a thickness of about 40 to 80 μm is often used as the protective film. From the viewpoint of reducing the thickness of the liquid-crystal display element, there may be a case where the protective film is laminated with only one surface of the polarizer. Finally, the acrylic adhesive layer 12 is formed on one side of the polarizer having the protective film laminated thereon to thereby manufacture the polarizing composite film 11 including the adhesive layer.

The polarizing composite film 11 generally has a thickness of about 110 to 220 μm. The polarizing composite film 11 is generally comprised of a polarizer having a thickness of about 20 to 30 μm, a protective film of which thickness may be about 80 to 160 μm when two protective films are laminated on respective ones of opposite surfaces of the polarizer, and an adhesive layer 12 of which thickness formed on one side of the polarizer to be laminated to a liquid-crystal panel W is about 10 to 30 μm. The polarizing composite films 11 are laminated to respective ones of the front and back sides of the liquid-crystal panel W with the adhesive layer 12 in such a manner that polarizing axes intersect each other at an angle of 90 degrees. Thus, in manufacturing a liquid-crystal display element for a widescreen television having a diagonal screen size of 42 inch, on an assumption that a thickness of a liquid-crystal panel W itself is about 1400 μm, and since the thickness of the polarizing composite film 11 is in the range of 110 to 220 μm, the liquid-crystal display element itself has an overall thickness of about 1620 to 1840 μm. The thickness of the liquid-crystal display element is still within 2.0 mm or less. In this case, the ratio of the thickness of the liquid-crystal display element to the overall thickness of the liquid-crystal panel W and the polarizing composite film 11 is about 10:1.5 to 10:3. If use is made of a polarizing composite film 11 having a protective film laminated to only one surface of the polarizer, and an adhesive layer 12 formed on the other surface of the polarizer, from the viewpoint of reducing the thickness of the liquid-crystal display element, the thickness of the polarizing composite film 11 itself can be reduced to 70 to 140 μm, so that an overall thickness of the resultant liquid-crystal display element is reduced to a range of about 1540 to 1680 μm. The ratio of the thickness of the liquid-crystal display element to that of the liquid-crystal panel W and the polarizing composite film 11 will be in the range of about 10:1 to 10:2.

A continuous web of an optical film laminate with predefined slit lines 10, according to embodiments of the present invention, for use in sequentially manufacturing liquid-crystal display elements has a structure as shown in FIG. 3 (2). The structure of the optical film laminate with predefined slit lines 10 will be briefly described below, in connection with a manufacturing process thereof. A surface-protection film 14 with an adhesive surface having a thickness of about 60 to 70 μm is releasably laminated to the surface of a polarizing composite film 11 devoid of an adhesive layer 12, and a carrier film 13 is releasably laminated to an adhesive layer 12 provided on the surface of the polarizing composite film 11 which is to be laminated to the liquid-crystal panel W for providing a function of protecting the adhesive layer 12. Typically, a PET (polyethylene terephthalate)-based film is used for each of the carrier film 13 and the surface-protection film 14. During the manufacturing process of the liquid-crystal display element, the carrier film 13 generally serves as a carrying medium (carrier) for the polarizing composite film, as well as the means to protect the adhesive layer 12, and thus it will hereinafter be referred to as a "carrier film". Both of the carrier film 13 and the surface-protection film 14 are so-called "manufacturing-process materials" which are to be peeled and removed prior to the final stage of the manufacturing process of the liquid-crystal display element. Both of the films are to be used for protecting the non-adhesive surface from being soiled or damaged, and also protecting the exposed surface of the adhesive layer, of the polarizing composite film 11, during the manufacturing process of the liquid-crystal display elements.

In the polarizing composite film 11, one of the protective films may be replaced with a phase difference film made of a cycloolefin-based polymer, a TAC-based polymer or the like and having an optical compensation function. It may further be possible to provide as a layer on a transparent substrate, such as a TAC-based substrate, by applying/disposing and then curing a polymer material, such as a polyester-based polymer or a polyimide-based polymer on the substrate. Further, in the case where a polarizing composite film to be laminated to the backlight side of the liquid-crystal display element, it may be possible to provide an additional function by laminating a brightness enhancement film to the backlight side protective film of the polarizer. In addition, regarding the structure of the polarizing composite film 11, there have been proposed various other variations, such as a technique of laminating a TAC-based film to one of opposite surfaces of the polarizer and laminating a PET film to the other surface of the polarizer.

One of the methods for providing a polarizing composite film without adhesive layer 11° including a polarizer and a protective film laminated on one or both of opposite surfaces of the polarizer devoid of an adhesive layer 12 for laminating to a liquid-crystal panel W comprises a step of laminating a carrier film 13 having a transferable adhesive layer formed thereon, to the surface of the polarizing composite film without adhesive layer 11° to be laminated to the liquid-crystal panel W. A specific transfer technique is as follows. In a manufacturing process of the carrier film 13, the carrier film is subjected to a releasing treatment at the surface which is to be laminated to the polarizing composite film 11° at the surface which is to be laminated to the liquid-crystal panel W, and then a solvent containing adhesive is applied to the treated surface and dried to form an adhesive layer on the carrier film 13. Then, the carrier film 13 having the formed adhesive layer is laminated to the polarizing composite film 11°, for example, while feeding out the carrier film 13 and feeding out the polarizing composite film 11° in the same manner, so that the adhesive layer formed on the carrier film 13 can be transferred to the polarizing composite film 11°, and the adhesive layer is formed. Alternatively, instead of the adhesive layer being formed in this manner, the adhesive layer 12 may be formed by directly applying a solvent containing adhesive to the surface of the polarizing composite film 11° to be laminated to the liquid-crystal panel, and drying the same.

The surface-protection film 14 typically has an adhesive surface. Unlike the adhesive layer 12 of the polarizing composite film 11, the adhesive surface must be peeled from a polarizing sheet of the polarizing composite film 11 together with a surface-protection film sheet 14 when the surface-protection film sheet 14 is peeled and removed from the polarizing sheet during the manufacturing process of the liquid-crystal display elements. The reason is that the surface-protection film sheet 14 which is formed together with the polarizing sheet is adapted for protecting the surface of the polarizing sheet devoid of an adhesive layer 12 from the risk of being soiled or damaged, but not an adhesive surface to be transferred to the surface of the polarizing sheet. The perspective view of FIG. 3 (3) shows the state after the surface-protection film 14 is peeled and removed. It should further be noted that, irrespective of whether the polarizing composite film 11 has a surface-protection film laminated thereon, it may be possible to provide the polarizing composite film 11 at the surface of the protective film on the front side of the polarizing composite film with a hard coat treatment for protecting the outermost surface of the liquid-crystal display element, and/or a surface treatment for obtaining an anti-glare effect or the like, such as an anti-glare treatment.

2. A Continuous Manufacturing System and Method for Liquid-Crystal Display Element Using a Continuous Web of an Optical Film Laminate with Predefined Slit Lines
(General Description of a Continuous Manufacturing System for Liquid-Crystal Display Elements)

Figure 4:
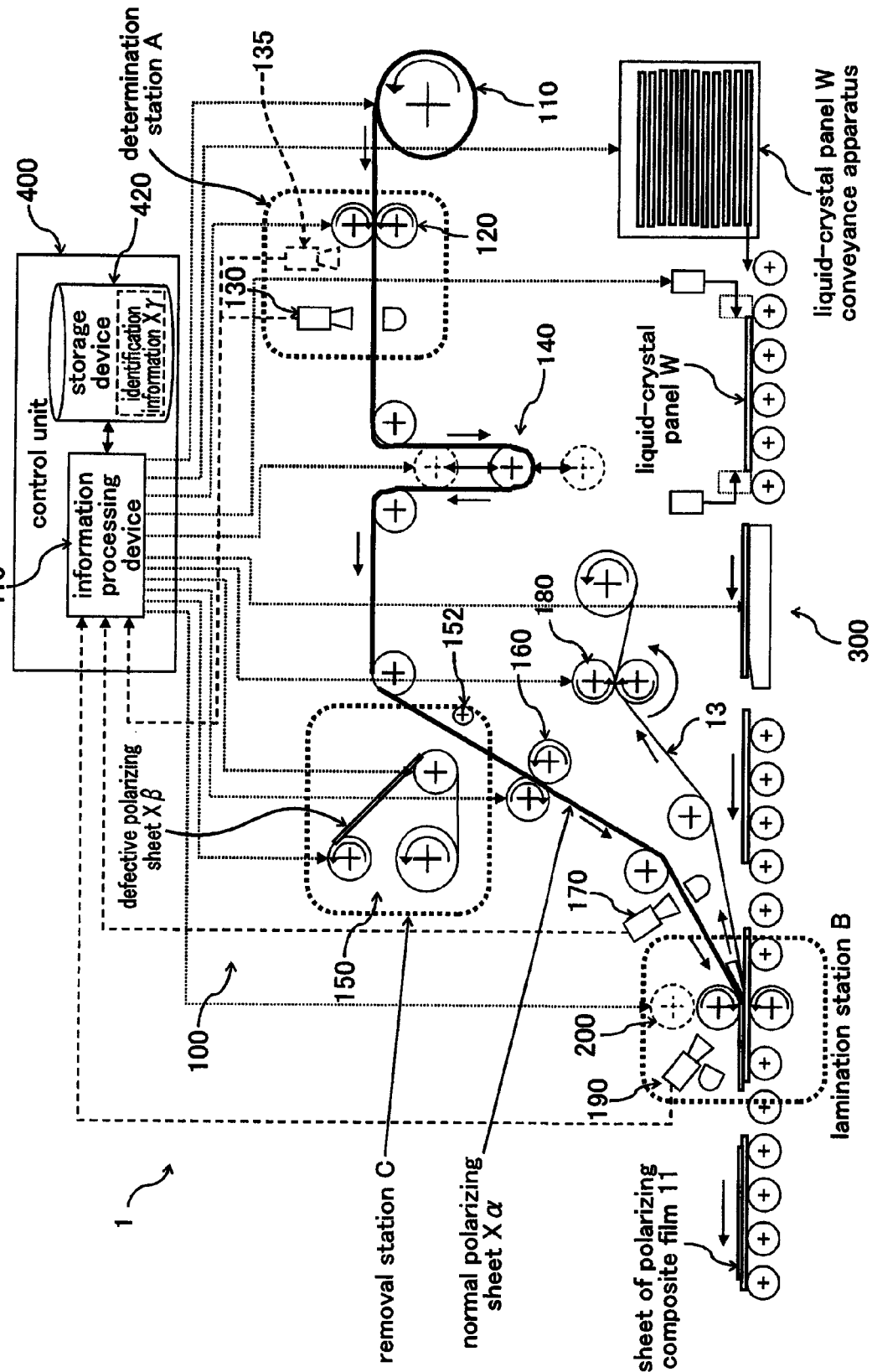
FIG. 4 is a conceptual diagram showing a continuous manufacturing system for liquid-crystal display elements using a continuous web of an optical film laminate with predefined slit lines, according to one embodiment of the present invention.

FIG. 4 is a schematic diagram showing a continuous manufacturing system 1 for sequentially manufacturing liquid-crystal display elements. The system 1 comprises an optical film feed unit 100 for feeding a continuous web of an optical film laminate with predefined slit lines 10. It also comprises a liquid-crystal panel conveyance apparatus 300 for conveying each of a plurality of liquid-crystal panels W and a control unit 400 for controlling overall operations of the optical film feed unit 100 and the liquid-crystal panel conveyance apparatus 300. The continuous web of an optical film laminate with predefined slit lines 10 comprises normal polarizing sheets Xα and defective polarizing sheets Xβ defined by slit lines 16 which are sequentially formed in a transverse direction of the optical film, and a carrier film 13 releasably laminated to an adhesive layer 12 of the polarizing composite film 11, and the laminate 10 is fed to a removal station C for peeling and removing the defective polarizing sheets Xβ from the carrier film 13. Then, The continuous web of an optical film laminate with predefined slit lines 10 is fed to a lamination station B, and each of the plurality of liquid-crystal panels W is sequentially laminated with only the normal polarizing sheets Xα which has been removed from the carrier film 13. The liquid-crystal panel W is fed in synchronization with the feed of the normal polarizing sheets Xα.

Figure 5:
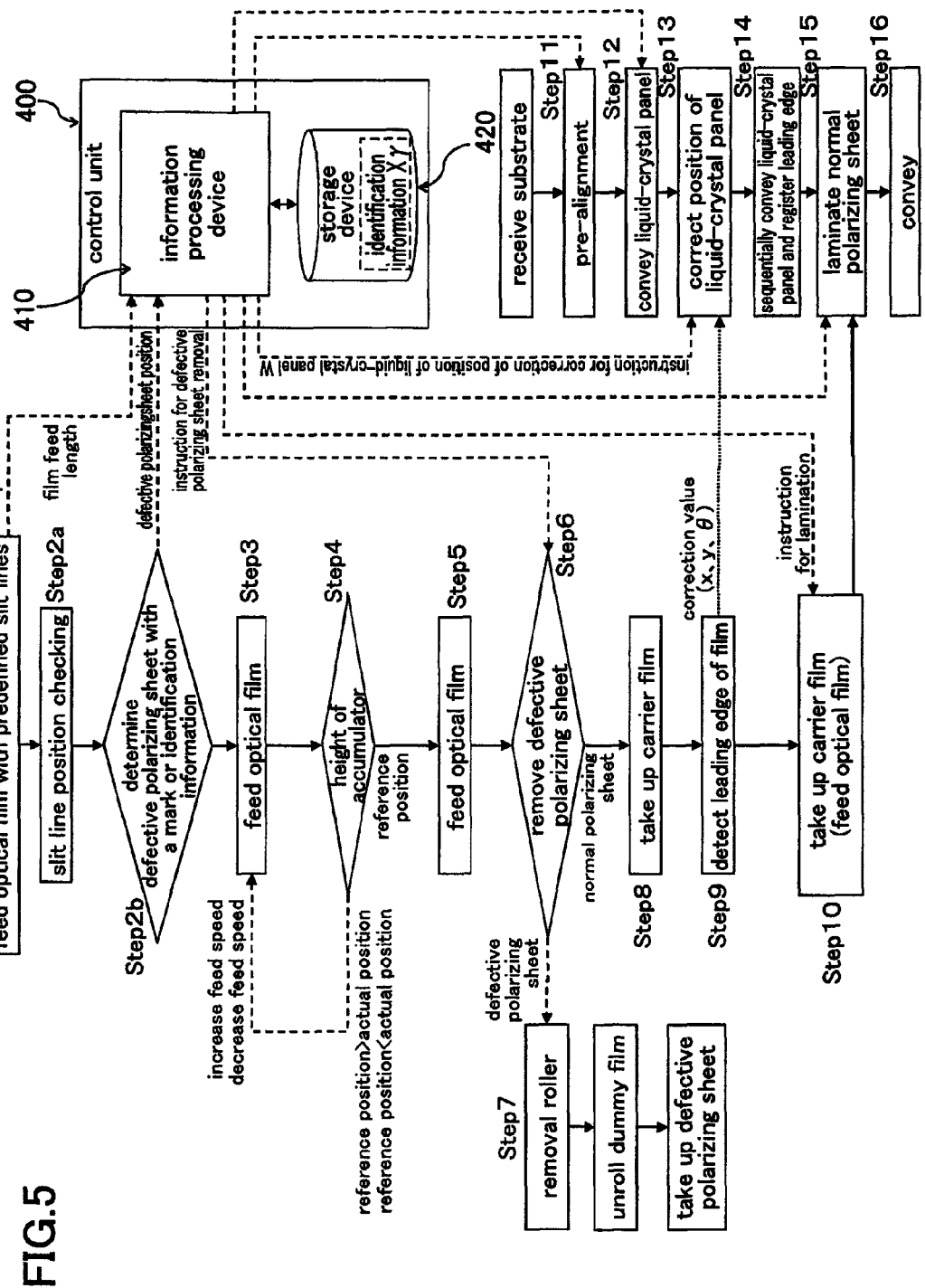
FIG. 5 is a flowchart showing manufacturing processes or process steps in the continuous manufacturing system in FIG. 4.

FIG. 5 is a flowchart showing a manufacturing process or process steps in the continuous manufacturing system for liquid-crystal display element in FIG. 4.

Figure 6:
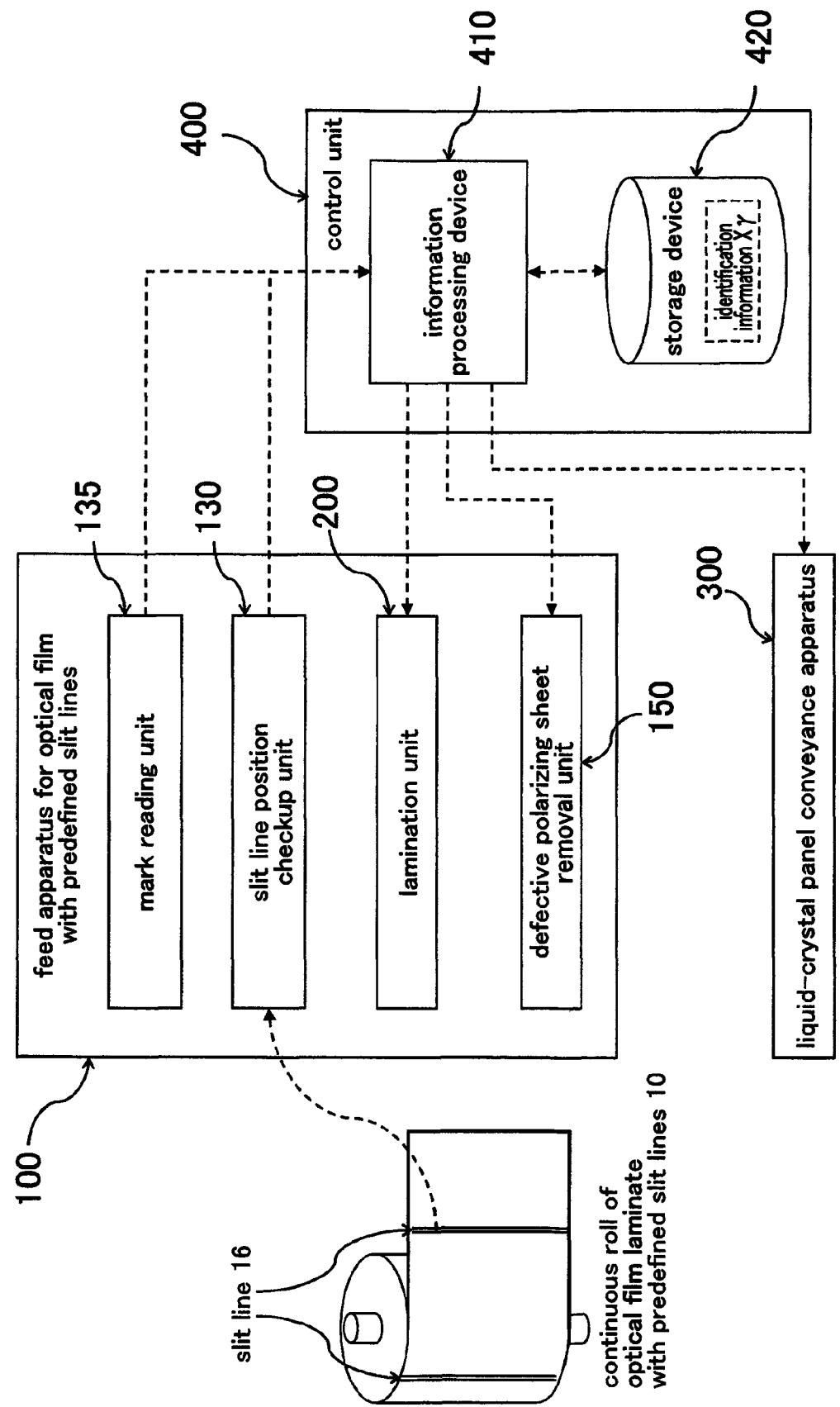
FIG. 6 is a schematic diagram showing the relationship between a control unit for controlling device of the feed unit of the continuous web of the optical film laminate with predefined slit lines and the liquid-crystal-panel feed unit, and information read and imaged by a slit line position check-up unit in the continuous manufacturing system of the liquid-crystal display element using a continuous web of an optical film laminate with predefined slit lines, according to one embodiment of the present invention.

FIG. 6 is a schematic diagram showing the relationship between information formed by reading and imaging the slit lines 16 sequentially formed on the continuous web of the optical film laminate 10 by a slit line position check-up unit 130, a mark read by an optionally provided mark reading unit 135 or identification information Xγ stored in a storing unit 420, a lamination unit 200 for laminating only the normal polarizing sheet Xα with the liquid-crystal panel W, a defective polarizing sheet removal unit 150, the liquid-crystal panel conveyance apparatus 300, and the control unit 400.

The feed unit 100 for feeding the continuous web of an optical film laminate with predefined slit lines comprises a support rack 110 for rotatably mounting a roll of the continuous web of optical film laminate with predefined slit lines 10, a film feed unit 120 including a feed roller, a slit line position check-up unit 130 for checking positions of slit lines 16, a mark reading unit 135 provided when necessary, a speed adjustment unit 140 including a dancer roller which functions to adjust the film path for providing a constant film feed speed, a defective-polarizing-sheet removal unit 150 provided for peeling and removing a defective polarizing sheet Xβ from the carrier film 13, a film feed unit 160 including a feed roller, a lamination unit 200 provided for peeling the normal polarizing sheets Xα from the carrier film 13, a carrier-film take-up drive mechanism 180 for taking up the carrier film 13, an edge detection unit 190 for detecting the leading edge of the normal polarizing sheet Xα, and a straight-ahead-posture or position detection unit 170 for measuring deviations of the normal polarizing sheet Xα with respect to the lengthwise direction and the transverse direction, as shown in the FIG. 4. It should be noted that since the mark reading unit 135 is not necessary for an embodiment where a roll of laminate using the identification information Xγ as identification means is used, the unit 135 is shown with a dotted line in FIG. 4. Similarly, the identification information Xγ is not necessary for an embodiment where a roll of laminate using a mark as identification means is used, it is shown with a dotted line.

(Composition of the Continuous Web of Optical Film Laminate with Predefined Slit Lines)

It is preferable that the continuous web of the optical film laminate with predefined slit lines 10 provided in the feed unit 100 has a width corresponding to a length of a long or short side of a liquid-crystal panel to which it is applied. As shown in FIG. 3 (2), the continuous web of the optical film laminate with predefined slit lines 10 is an optical film obtained by sequentially forming slit lines on a continuous web of an optical film laminate 15 comprising a polarizing composite film 11 having an adhesive layer 12 provided on the surface of a polarizer which has a transparent protective film laminated thereon and which is to be attached to a liquid-crystal panel W, and a carrier film 13 releasably laminated on the adhesive layer 12. The polarizing film sheets 11 are formed in separated-state by the slit lines on the carrier film 13 of the continuous web of the optical film laminate 10. It should further be noted that, as shown in FIGS. 3(1) and 3(2), the optical film laminate 10 may be formed with predefined slit lines from a continuous web of an optical film laminate 15 which has an additional surface-protection film 14 having an adhesive surface releasably laminated on the surface of the polarizing composite film opposite to the surface on which the carrier film 13 is laminated. In the case, slit lines may be formed through the polarizing composite film 11 and the surface-protection film 14 to thereby form sheets of the polarizing composite film 11 and those of the surface-protection film 14 simultaneously on the carrier film 13.

The carrier film 13 primarily is a releasable film adapted to protect the adhesive layer 12 of the polarizing sheets 11 during the process wherein slit lines are formed in the continuous web of an optical film laminate and when the polarizing sheets 11 are used to produce the liquid-crystal display elements. Therefore, when the polarizing sheets 11 are peeled off the carrier film 13 at the adhesive layer 12 for lamination to the liquid-crystal panel W, the carrier film is taken up by a take-up roll.

The continuous web of optical film laminate with predefined slit lines 10 is manufactured by either of the following methods, although details of the method will be described later. In a first method, a continuous web of a polarizing composite film without adhesive layer 11° is manufactured with a surface-protection film laminated to at least one of the surfaces of the polarizer and is immediately transported to an inspection station M. At the inspection station M, defects in the polarizing composite film without adhesive layer 11° are detected by inspecting the surface and the inside of the transported continuous web of the polarizing composite film without adhesive layer 11°.

After detecting defects in the polarizing composite film 11° at the inspection station M, the carrier film 13 is releasably laminated with the adhesive layer 12 to manufacture the optical film laminate 15. When necessary, it is possible to provide the optical film laminate 15 with a surface-protection film 14 releasably laminated on the polarizing composite film opposite to the surface on which the carrier film 13 is laminated.

The manufactured continuous web of optical film laminate 15 is then transported to the slit-forming station N. The slitting unit provided at the slit-forming station N sequentially forms slit lines 16 in the widthwise direction with respect to the lengthwise direction at the side opposite to the carrier film to a depth reaching a surface of the carrier film 13 adjacent to the adhesive layer. The interval of the two consecutive slit lines 16 is equivalent to a predefined length corresponding to a size of the liquid-crystal panel W. Thus, between the two consecutive slit lines 16 formed, there are formed normal polarizing sheets Xα without defects and defective polarizing sheets Xβ with defects of the polarizing composite film 11° including sheets of the surface-protection film 14.

Based on the positions of defects detected at the inspection unit M, identification means is generated to identify the defective polarizing sheets Xβ and the normal polarizing sheets Xα for the system 1 for sequentially manufacturing liquid-crystal display elements. In one embodiment of the present invention, the identification means is a mark provided at any position in the optical film laminate 15 by a marking unit, prior to or after forming the slit lines 16 on the optical film laminate 15. In another embodiment of the present invention, the identification means is identification information Xγ configured to indicate whether a sheet is a defective polarizing sheet Xβ or a normal polarizing sheet Xα. The identification information Xγ is generated as a flag to indicate that a sheet in between any two slit lines is a defective polarizing sheet Xβ with one or more defects and that another sheet in between any two slit lines is a normal polarizing sheet Xα without any defect, by associating the positions of defects detected through the inspection with the positions of the slit lines formed. Further, in another embodiment, it is possible to generate the identification information Xγ as a flag configured to indicate specific serial numbers of the respective sheets counted from the first sheet of the optical film laminate 10 as defective polarizing sheets by associating the positions of defects detected through the inspection with the serial numbers of sheets. By generating the identification information Xγ, a finished continuous web of the optical film laminate with predefined slit lines 10 is obtained. That is, the continuous web of the optical film laminate with predefined slit lines 10 according to the present invention is a film generated by performing the defect inspection prior to the use in the system 1 for sequentially manufacturing liquid-crystal display elements and generating a means to identify the defective polarizing sheet Xβ with one or more defects.

The second manufacturing method is one that uses a continuous web of a provisional optical film laminate 15 that comprises a polarizing composite film 11 at least having an adhesive layer 12 preliminarily provided, and a provisional carrier film 13' that is releasably laminated to the adhesive layer 12. First, such continuous web of the provisional optical film laminate 15' is provided, for example, in the form of a roll and is provided to the manufacturing process. At the peeling station L, the provisional carrier film 13' in the continuous web of the provisional optical film laminate 15' is peeled from the adhesive layer 12 of the polarizing composite film 11, and thus the polarizing composite film 11 having the adhesive layer 12 is exposed.

The polarizing composite film 11 having the exposed adhesive layer 12 is transported to the inspection station M. At the inspection station M, defects in the continuous web of the polarizing composite film 11 having the adhesive layer 12 are detected by inspecting the surface and the inside of the transported polarizing composite film 11. In the first manufacturing method, the defect inspection is carried out on the polarizing composite film without adhesive layer 11° before the adhesive layer 12 is applied, but in the second manufacturing method, the defect inspection is carried out on the polarizing composite film 11 having the adhesive layer 12 provided thereon. Based on the positions of defects detected at the inspection station M, identification means is generated to identify the defective polarizing sheets Xβ and the normal polarizing sheets Xα during operation of the system 1 for sequentially manufacturing liquid-crystal display elements.

After detecting defects in the inspection station M, the carrier film 13 is attached to the polarizing composite film 11 in the place of the peeled provisional carrier film 13'. The carrier film 13 is releasably laminated to the adhesive layer 12 of the polarizing composite film 11 to provide the optical film laminate 15. When necessary, the optical film laminate 15 may have a surface-protection film 14 releasably laminated on the polarizing composite film at a surface opposite to the surface on which the carrier film 13 is laminated.

Hereafter, in both the first and the second manufacturing methods, the continuous web of an optical film laminate 10 is manufactured through similar manufacturing steps. A process to manufacture a continuous web of an optical film laminate with predefined slit lines 10 into a roll can be included in both methods, when necessary.

(General Description of Liquid-Crystal Display Element Manufacturing)

The manufacturing method for liquid-crystal display elements using the continuous web of an optical film laminate with predefined slit lines 10 is outlined in the followings referring to FIGS. 4 and 5. As shown in FIG. 4, a continuous web of an optical film laminate with predefined slit lines 10 is rotatably loaded to a support rack 110 in a form, for example, of a roll. The optical film laminate 10 fed out from the roll is transported to the determination station A by the film feed unit 120 including a feed roller. At the determination station A, there is provided a slit line position check-up unit 130 having a CCD in connection with the control unit 400 (step 1 in FIG. 5). If use is made of the optical film laminate with predefined slit lines 10 provided with a mark as identification means to identify the defective polarizing sheets Xβ, the mark reading unit 135 for reading mark is further provided at the determination station A.

At the determination station A, the slit line position check-up unit 130 preferably takes images and produce picturized images of the sequentially formed slit lines on the optical film laminate with predefined slit lines by an optical sensor including, for example, a CCD camera to calculate the positions of the slit lines 16 from the images (step 2*a*). Then, sheets of the polarizing composite film 11 defined on the carrier film 13 by the slit lines formed in a transverse direction with respect to the lengthwise direction of the optical film laminate with predefined slit lines 10 are determined to be a defective polarizing sheet Xβ or a normal polarizing sheet Xα (step 2*b*). In one embodiment of the present invention, a mark previously provided to the optical film laminate with predefined slit lines 10 is read by the mark reading unit 135 at the determination station A. The order of reading the mark and checking the slit line positions may be altered. Based on the calculated positions of the slit lines 16 and the positions of the marks on the optical film laminate with predefined slit lines 10, the sheets with the marks are determined to be the defective polarizing sheets Xβ. The positions of the sheets determined to be the defective polarizing sheets Xβ are stored in the storing unit 420 for use in a later process. As such, checking the positions of the slit lines 16 by the slit line position check-up unit 130 allows for more accurate removal of the defective polarizing sheets Xβ in a later process. Although the accuracy of removing the defective polarizing sheets Xβ may be slightly sacrificed, it is possible to remove the defective polarizing sheets Xβ faster by abbreviating the process of checking the positions of the slit lines 16 without providing the slit line position check-up unit 130. In this case, the distance from the leading edge of the optical film laminate with predefined slit lines 10 or from an appropriate reference position to the mark and the slit line position is calculated from a feed length of the optical film laminate with predefined slit lines 10 to determine the positions of the defective polarizing sheet Xβ.

In another embodiment of the present invention, the positions of the defective polarizing sheets Xβ are determined using identification information Xγ indicating whether a sheet between any two slit lines 16 is a defective polarizing sheet Xβ or a normal polarizing sheet Xα. The slit line position check-up unit 130 takes images and produce picturized images of the sequentially formed slit lines on the optical film laminate with predefined slit lines by an optical sensor including, for example, a CCD camera to calculate the positions of the slit lines 16 from the images. Then, the identification information Xγ associated with the positions of the slit lines 16 is read out from the storing unit 420, for determining whether the sheet between any two slit lines 16 is a defective polarizing sheet Xβ or a normal polarizing sheet Xα based on the identification information Xγ and the positions of the slit lines 16, which are read out. The positions of the sheets determined to be the defective polarizing sheets Xβ are stored in the storing unit 420 for use in a later process. In yet another embodiment of the present invention, the identification information Xγ associated with the positions of the slit lines 16 is read out from the storing unit 420, for determining which one of the serial numbers of the sheets counted from the first sheet of the optical film laminate 10 is a defective polarizing sheet, based on the identification information Xγ and the positions of the slit lines 16, which are read out. In either embodiment using the identification information Xγ, the process of checking the positions of the slit lines 16 by the slit line position check-up unit 130 may be abbreviated, as in the case using marks. In this case, a position of each of the slit lines 16 is calculated with a feed length from the leading edge of the optical film laminate 10 or from an appropriate reference position to determine the positions of the defective polarizing sheet Xβ based on the calculated positions of the slit lines 16 and the identification information Xγ.

After determining the normal polarizing sheets Xα and the defective polarizing sheet Xβ as above, when a defective polarizing sheet Xβ on the carrier film 13 is transported to the removal station C, the control unit 400 sends an instruction to remove the defective polarizing sheet Xβ based on the stored identification information of the defective polarizing sheet Xβ and operates the defective-polarizing-sheet removal unit 150 including a movable roller 152, by controlling the operations of the speed adjustment unit 140 for providing a constant speed of film feeding and the feed unit 160 including a feed roller in an inter-related manner. The defective polarizing sheet removal unit 150, as shown by step 7 in FIG. 5, peels and removes only the sheets determined to be defective polarizing sheets Xβ from the carrier film 13 among the polarizing sheets 11 being defined on the carrier film 13 by the slit lines 16 (step 6). The detail of removal of the defective polarizing sheet Xβ is described later.

The optical film laminate with predefined slit lines 10 from which the defective polarizing sheet Xβ has been removed at the removal station C includes only the normal polarizing sheets Xα between the two slit lines 16 on the carrier film 13. The optical film laminate with predefined slit lines 10 including only the normal polarizing sheets Xα is transported to the lamination station B by the film feed unit 160 including the feed roller and a carrier-film take up drive mechanism 180 for taking up the carrier film. At that moment, the straight-ahead-posture or position detection unit 170 checks whether the lengthwise direction and widthwise direction of the normal polarizing sheets Xα being formed on the carrier film 13 matches with the reference line.

Figure 9:
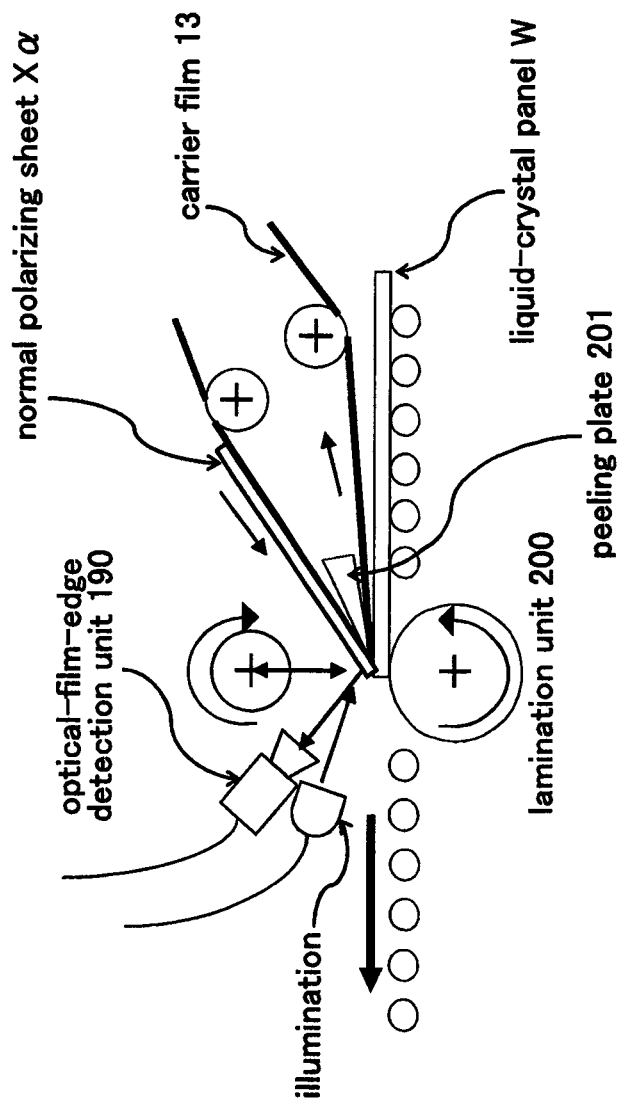
FIG. 9 is a schematic diagram showing a lamination unit of normal polarizing sheets and liquid-crystal panels in the continuous manufacturing system of the liquid-crystal display element using a continuous web of an optical film laminate with predefined slit lines, according to one embodiment of the present invention.

As shown in FIG. 9, the carrier film 13 is peeled off the polarizing sheet by being bent at an acute angle, via the peeling plate 201. By having the carrier film 13 peeled off in this manner, the surface of the adhesive layer of the normal polarizing sheets Xα may be gradually exposed. The leading edge of the normal polarizing sheet Xα, as being gradually peeled from the carrier film 13, is detected by the edge detection unit 190 (step 9). The normal polarizing sheets Xα, while being gradually peeled, is transported to the lamination unit 200 at the lamination station B after, preferably, the feeding speed of the sheets is adjusted to the speed suitable for the lamination with the liquid-crystal panel W. This makes it possible to slightly expose the leading edge of the normal polarizing sheet Xα to allow the leading edge of the liquid-crystal panel W sequentially conveyed to this edge position to be aligned with the leading edge of the normal polarizing sheet Xα. The details of transportation of the liquid-crystal panels shown by steps 11 to 16 in FIG. 5, and the lamination of the normal polarizing sheet Xα and the liquid-crystal panel W will be described later.

(Removal of Defective Polarizing Sheet Xβ)

Figure 7:
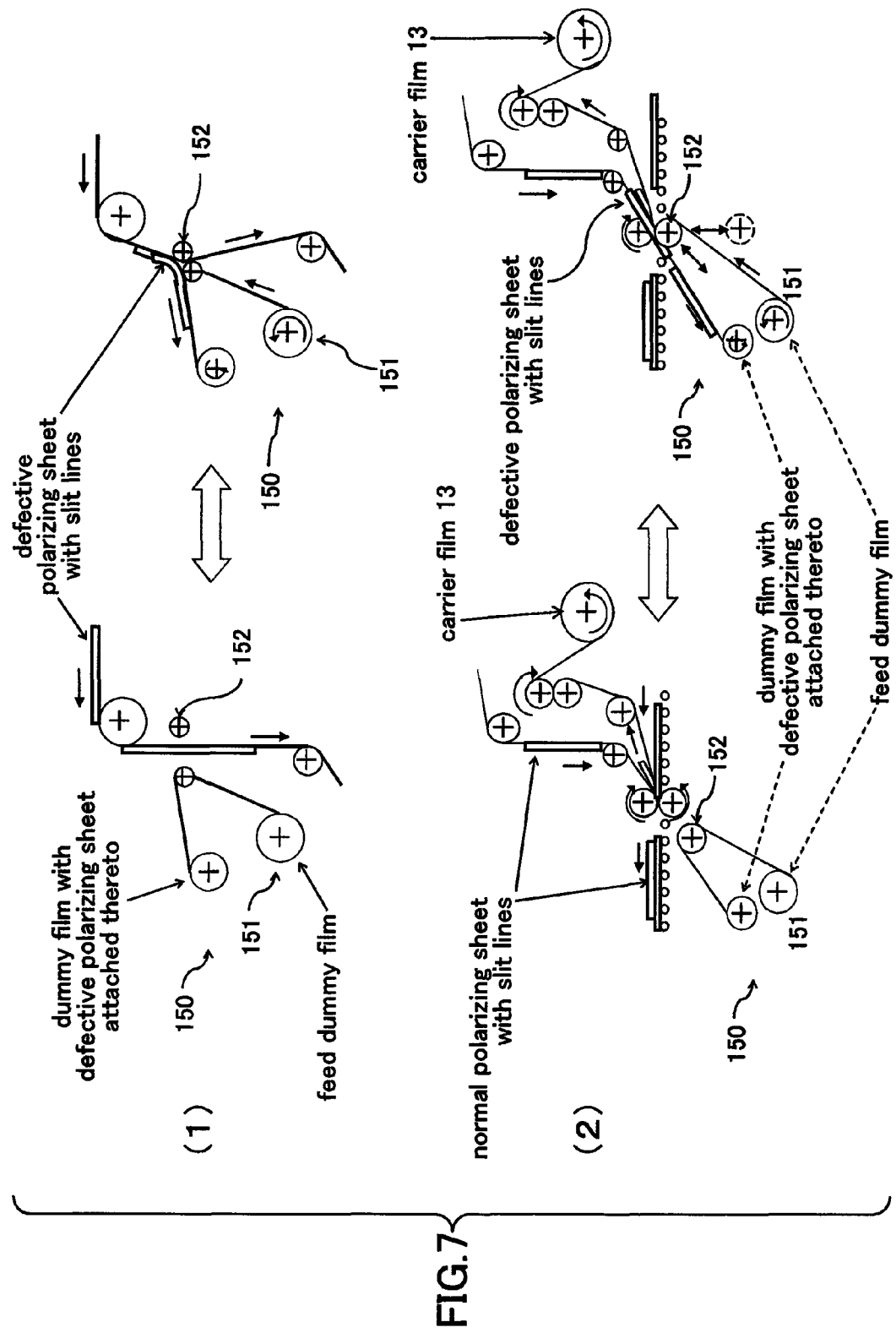
FIG. 7 is a schematic diagram showing a defective polarizing sheet removal unit operating to identify and remove defective polarizing sheets in the continuous manufacturing system of the liquid-crystal display element using a continuous web of an optical film laminate with predefined slit lines, according to one embodiment of the present invention.

The operation of the defective polarizing sheet removal unit 150 in the manufacturing process of the liquid-crystal display elements will now be described. The defective polarizing sheet removal unit 150 is operated under the control of the control unit 400. FIGS. 7 (1) and 7 (2) show such defective polarizing sheet removal unit 150 that peels and removes defective polarizing sheets Xβ from the carrier film 13, which are sheets determined as defective polarizing sheets Xβ by the slit line position check-up unit 130 among the normal polarizing sheets Xα and the defective polarizing sheets Xβ being defined on the carrier film 13 by the slit lines 16 included in the continuous web of optical film laminate with predefined slit lines 10. The defective polarizing sheet removal unit 150 comprises both of the dummy film drive mechanism 151 and the movable roller 152.

The defective polarizing sheet removal unit 150 in FIG. 7 (1) comprises a dummy-film drive mechanism 151 for feeding a dummy film so that the defective polarizing sheet Xβ releasably laminated to the carrier film 13 is peeled and attached to the dummy film, and a movable roller 152 adapted to shift the feed path of the continuous web of the optical film 10. When the defective polarizing sheet Xβ reaches an removal initiation position of the feed path of the continuous web of the optical film laminate 10, the movable roller 152 is activated by the instruction to remove the defective polarizing sheet Xβ from the control unit 400 whereby the feed path of the continuous web of the optical film 10 is shifted to a position wherein the path comes into contact with the dummy film feed path of the dummy film drive mechanism 151. The defective polarizing sheets Xβ on the carrier film 13 are peeled from the carrier film 13 and laminated to the dummy film in the feed path of the dummy film to be removed from the feed path of the continuous web of the optical film with slit lines 10. After the defective polarizing sheet Xβ is removed, the movable roller 152 returns to the original position, whereby the feed path of the continuous web of the optical film laminate with predefined slit lines 10 and that of the dummy film driven by the dummy film drive mechanism 151 are detached.

The defective polarizing sheet removal unit 150 illustrated in FIG. 7(2) is configured, under the instruction of the control unit 400 to remove the defective polarizing sheets Xβ, to be operated in an inter-related manner with the lamination unit 200 including a pair of lamination rollers provided at the lamination station B. It comprises a dummy-film drive mechanism 151 having a function of feeding a dummy film so that the defective polarizing sheet Xβ is peeled off the carrier film and attached to the dummy film, and a movable roller 152 defining a dummy-film feed path of the dummy-film drive mechanism 151. The removal unit illustrated in FIG. 7 (2) is different from the removal unit illustrated in FIG. 7 (1) in that, in the removal unit illustrated in FIG. 7 (2), the movable roller 152 disposed adjacent to the pair of lamination rollers of the lamination unit 200 at the lamination station B is arranged in a replaceable manner with one of the pair of the lamination rollers in the lamination unit 200.

More specifically, when the defective polarizing sheet Xβ reaches an end position (i.e., the removal initiation position) of the feed path of the continuous web of the optical film with predefined slit lines, the pair of lamination rollers are moved apart from each other, and the movable roller 152 is moved to a nip between the lamination rollers in spaced-apart relation to replace the roller with one of the rollers of the pair of the lamination roller. Thus, the movable roller 152 and the other laminating roller are operated in an inter-related manner. In this instance, the carrier film 13 is taken up by the carrier-film take up drive mechanism 180, and the defective polarizing sheet Xβ is peeled from the carrier film 13, and the peeled defective polarizing sheet Xβ is attached to the dummy-film feed path by means of the movable roller 152 operated in an inter-related manner with the other lamination roller and removed without being laminated to the liquid-crystal panel W. After the defective polarizing sheet Xβ is removed, the movable roller 152 returns to the original position, and the laminating roller that was replaced by the movable roller returns to the position to be operated in an inter-related manner with the other laminating roller, i.e., the inter-related operation of the defective-polarizing-sheet removal unit 150 and the laminating unit 200 is released. When a normal polarizing sheet Xα on the carrier film 13 reaches to the lamination position, the lamination unit 200 makes the replaced lamination roller operate in an inter-related manner with the other lamination roller, for laminating the normal polarizing sheet Xα to the liquid-crystal panel.

(Conveyance of Liquid-Crystal Panel W)

A brief description of the liquid-crystal panel conveyance apparatus 300 for conveying the liquid-crystal panel W to the lamination unit 200 for laminating the liquid-crystal panel W with the normal polarizing sheets Xα defined by the slit lines 16 on the carrier film 13 of the continuous web of the optical film 10, will be given below.

Figure 1:
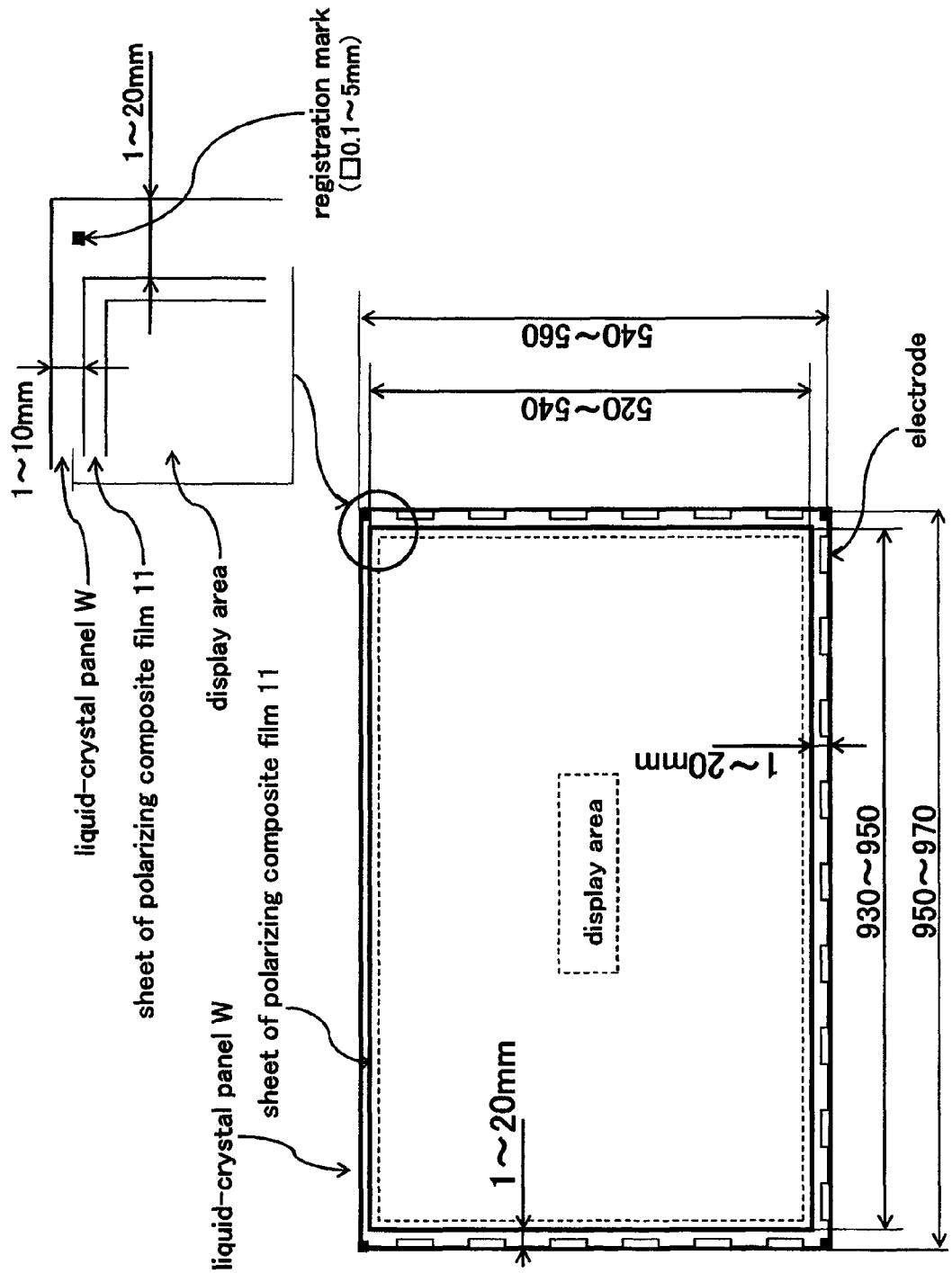
FIG. 1 illustrates a typical example of a liquid-crystal display element for a widescreen television having a diagonal screen size of 42 inches.

Taking a large size television having a diagonal screen dimension of 42 inches as an example, a rectangular-shaped liquid-crystal panel W has a size of about 540 to 560 mm in length and about 950 to 970 mm in width as shown in FIG. 1. During the manufacture process of liquid-crystal display elements, the liquid-crystal panel W is slightly trimmed along its peripheries during a wiring stage including mounting operations of electronic components. Alternatively, the liquid-crystal panel W may be transported or conveyed with peripheries already trimmed. The liquid-crystal panels W are taken out one-by-one from a magazine containing a large number of liquid-crystal panels, by means of a liquid-crystal-panel supply apparatus, and as shown by steps 11 to 16 in FIG. 5, conveyed through cleaning/polishing stage to the lamination unit 200 at the lamination station B for lamination with respective ones of the normal polarizing sheet Xα, being adjusted to equal intervals and a constant transportation speed by the conveyance apparatus 300.

Figure 8:
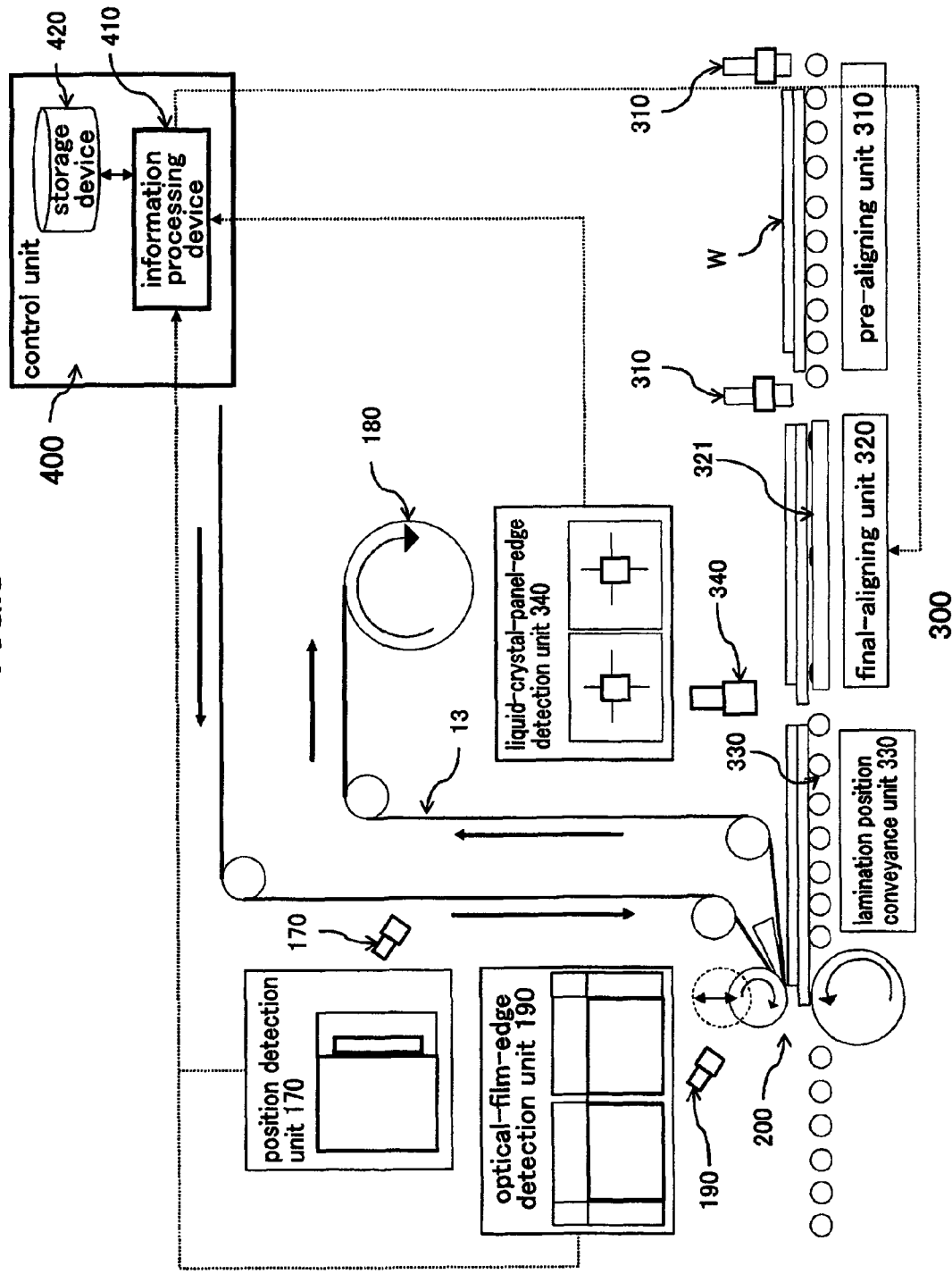
FIG. 8 a schematic diagram showing posture-controlled liquid-crystal panels being conveyed to a lamination unit in the continuous manufacturing system of the liquid-crystal display element using a continuous web of an optical film laminate with predefined slit lines, according to one embodiment of the present invention.

FIG. 8 is a schematic diagram showing the conveyance of the liquid-crystal panel W in an aligned orientation under the control of the control unit 400 based on identification information associated with a sheet determined to be a normal polarizing sheet Xα. The conveyance apparatus 300 includes a liquid-crystal panel orientation controlling unit comprising a pre-alignment unit 310, an alignment unit 320, a conveyance unit 330 for conveying the panels to the lamination position, and a panel-edge-detection unit 340 for detecting the leading edge of the liquid-crystal panel W, for aligning the orientation of the liquid-crystal panel W in a final stage of the conveyance of the liquid-crystal panel W sequentially delivered to the lamination station B when the normal polarizing sheet Xα is transported to the lamination station B, in synchronization with the transportation of the normal polarizing sheet Xα.

(Lamination of Normal Polarizing Sheet Xα to Liquid-Crystal Panel W)

As shown in FIG. 9, the leading edge of the normal polarizing sheet Xα is moved to the nip defined between the pair of lamination rollers of the lamination unit 200 when the rollers are in the vertically spaced apart relation to each other, and detected by the optical film edge detection unit 190. Although the normal polarizing sheet Xα is fed in a state laminated on the carrier film 13, it is seldom that the normal polarizing sheet Xα is accurately fed so that the angle θ between its lengthwise direction and the lengthwise direction of the carrier film 13 becomes zero. Therefore, deviations of the normal polarizing sheet Xα in the lengthwise direction and the transverse direction are measured, for example, by taking images of the sheet using the CCD camera of the straight-ahead-posture or position detection unit 170 and subjecting the taken images to an image processing, whereby the measured deviations are calculated in terms of x, y and θ, and the calculated data is stored in the storage device 420 by the control unit 400.

The liquid-crystal panels W are sequentially positioned by the pre-alignment unit 310, so that they are aligned in lengthwise and widthwise directions respectively with the transport direction and the direction transverse to the transport direction in the conveyance path. The positioned liquid-crystal panel W is conveyed to and placed on the final-alignment unit 320 which includes an alignment table adapted to be turned by a drive mechanism which is controlled by the control unit 400. The leading edge of the liquid-crystal panel W placed on the alignment table is detected by the panel-edge detection unit 340. The position of the detected leading edge of the liquid-crystal panel W is checked for match with the reference lamination position stored in the storage device 420, specifically, the calculation data in terms of x, y and θ to represent the orientation of the normal polarizing sheet Xα to be laminated to the liquid-crystal panel W. For example, the deviation between the leading edge of the liquid-crystal panel W and the reference lamination position is measured using an alignment mark of the liquid-crystal panel W illustrated in FIG. 1 to calculate the angular displacement θ, and the alignment table having the liquid-crystal panel W placed thereon is turned by the angular displacement θ. Then, the alignment table is connected to the conveyance unit 330 to lamination unit 200 at the lamination station B. The liquid-crystal panel W is conveyed to the lamination position while keeping the same orientation, by the conveyance unit 330 to the lamination unit 200 at the lamination station B. The leading edge of the liquid-crystal panel W is registered with and laid on the leading edge of the normal polarizing sheet Xα at the lamination unit 200, as shown in FIG. 8. In the final stage, the normal polarizing sheet Xα and the liquid-crystal panel W which are in aligned relation with each other and are held between the pair of lamination rollers and pressed thereby to obtain a finished liquid-crystal display element.

The normal polarizing sheet Xα is fed to the lamination position for lamination with the liquid-crystal panel W together with the carrier film 13 within the continuous web of the optical film with predefine slit lines 10 advanced under tension. The normal polarizing sheet Xα can be gradually peeled from the carrier film 13, so that there is least possibility that the periphery of the normal polarizing sheet Xα is bent or sagged as shown in FIG. 9. This makes it easy to have the orientation of the liquid-crystal panel W aligned with the normal polarizing sheet Xα. Such method and system increases the manufacturing speed of the liquid-crystal display element and improves the product accuracy which has been unachievable in the manufacturing process utilizing the individualized sheets, the process utilizing the individualized sheets to complete a liquid-crystal display element includes steps of peeling a separator from each of the individualized sheets to expose the adhesive layer, feeding under a vacuum suction each of the sheets to a lamination position, adjusting the position of the sheet with respect to the liquid-crystal panel W and laminating the sheet to the liquid-crystal panel W.

In addition, the polarizing composite film 11 constituting a continuous web of an optical film laminate 15 used for a continuous web of an optical film with predefined slit lines 10 may be made of a polarizer including a substrate of a PVA based material having at least one surface laminated with a protective film, preferably of a transparent material, with an adhesive layer 12 provided on the other surface. A continuous web of a carrier film 13 is releasably attached to the adhesive layer 12. In the conventional liquid-crystal display element manufacturing process using individualized sheets, generally, use is made of a sheet comprising a polarizer having two protective films laminated thereon at the opposite surfaces to impart stiffness as the polarizing composite film 11 as described above. However, in the liquid-crystal display element manufacturing process using the continuous web of the optical film with predefined slit lines 10, the normal polarizing sheet Xα of the polarizing composite film 11 is continuously defined on the carrier film 13 by the slit lines 16 so that the continuous normal polarizing sheet Xα is peeled sequentially from the carrier film 13 and sequentially laminated to the liquid-crystal panel W at the lamination unit 200 in the lamination station B. During this process, the normal polarizing sheet Xα may be drawn into the lamination station gradually. It is understood that there is no need of peeling the separator from each of the sheets as in the manufacturing process using the individualized sheets. When the normal polarizing sheet Xα is peeled from the carrier film 13, the leading edge of the normal polarizing sheet Xα is continuously registered with the leading edge of a corresponding one of a plurality of liquid-crystal panels W being sequentially conveyed on a sheet-by-sheet basis toward the lamination position, and then, the normal polarizing sheet Xα and the corresponding liquid-crystal panel W are laminated together by being pressed against each other by a pair of lamination rollers of the lamination unit 200. In this process, there is no risk that the periphery of the normal polarizing sheet Xα is bowed or warped since the sheet is gradually peeled from the leading edge to the intermediate portion. Thus, differently from the individualized sheet, in the polarizing composite film 11 included in the continuous web of the optical film with predefined slit lines 10 in the embodiments, the protective film may be laminated to only one of the surfaces of the polarizer.

Figure 10:
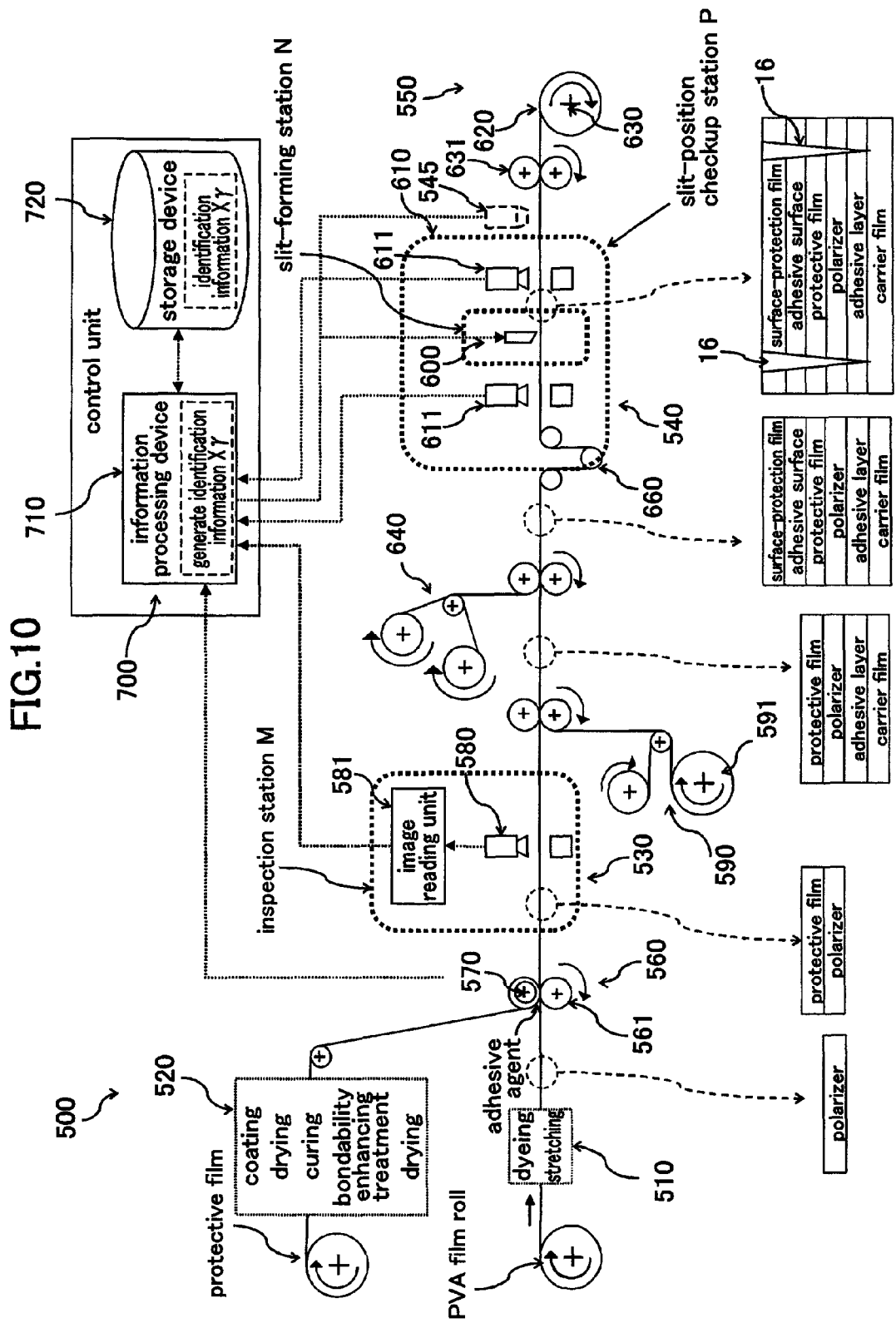
FIG. 10 is a schematic diagram showing a manufacturing system for a continuous web of an optical film laminate with predefined slit lines, according to a first embodiment of the present invention.
Figure 11:
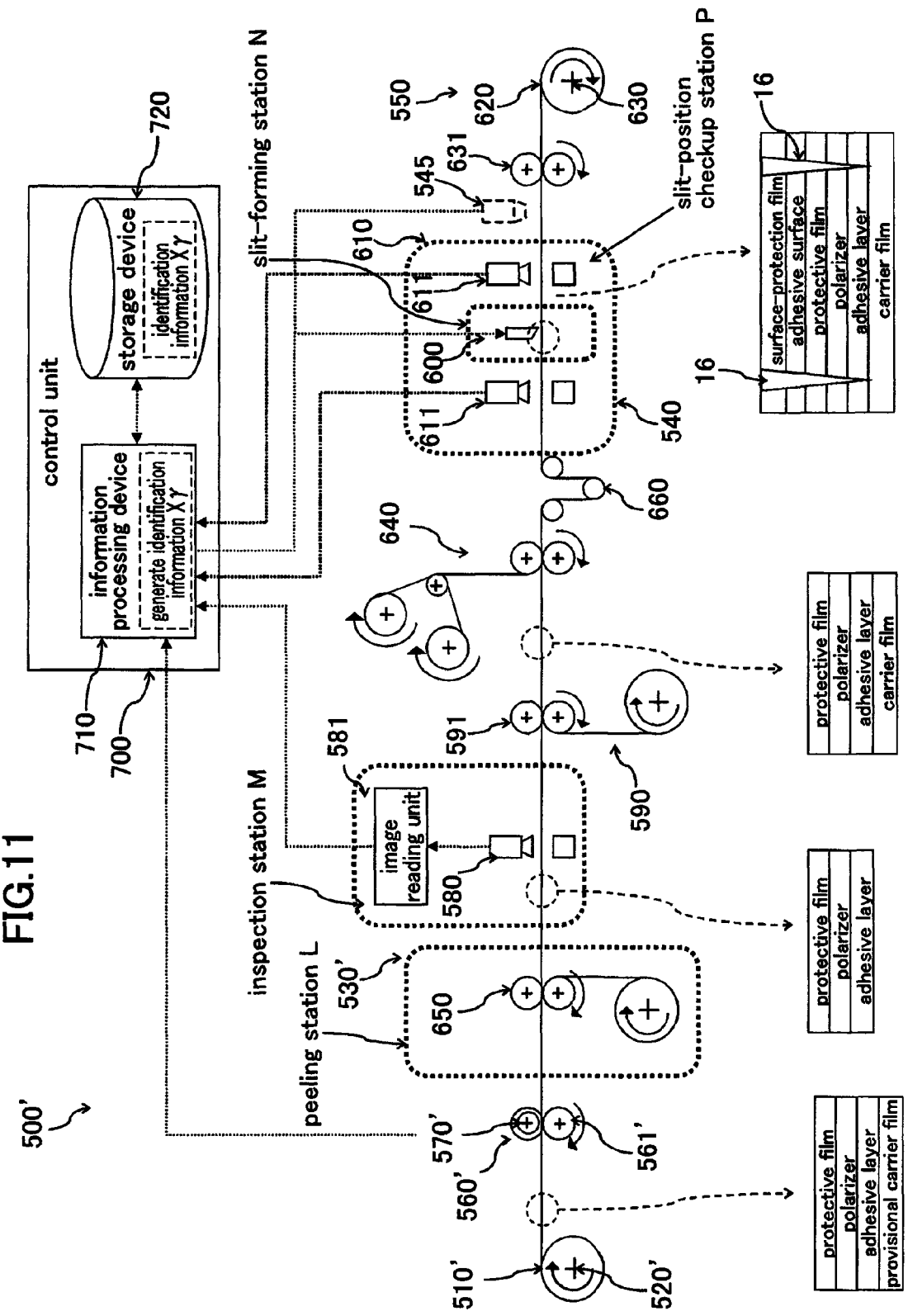
FIG. 11 is a schematic diagram showing a manufacturing system for a continuous web of an optical film laminate with predefined slit lines, according to a second embodiment of the present invention.
Figure 12:
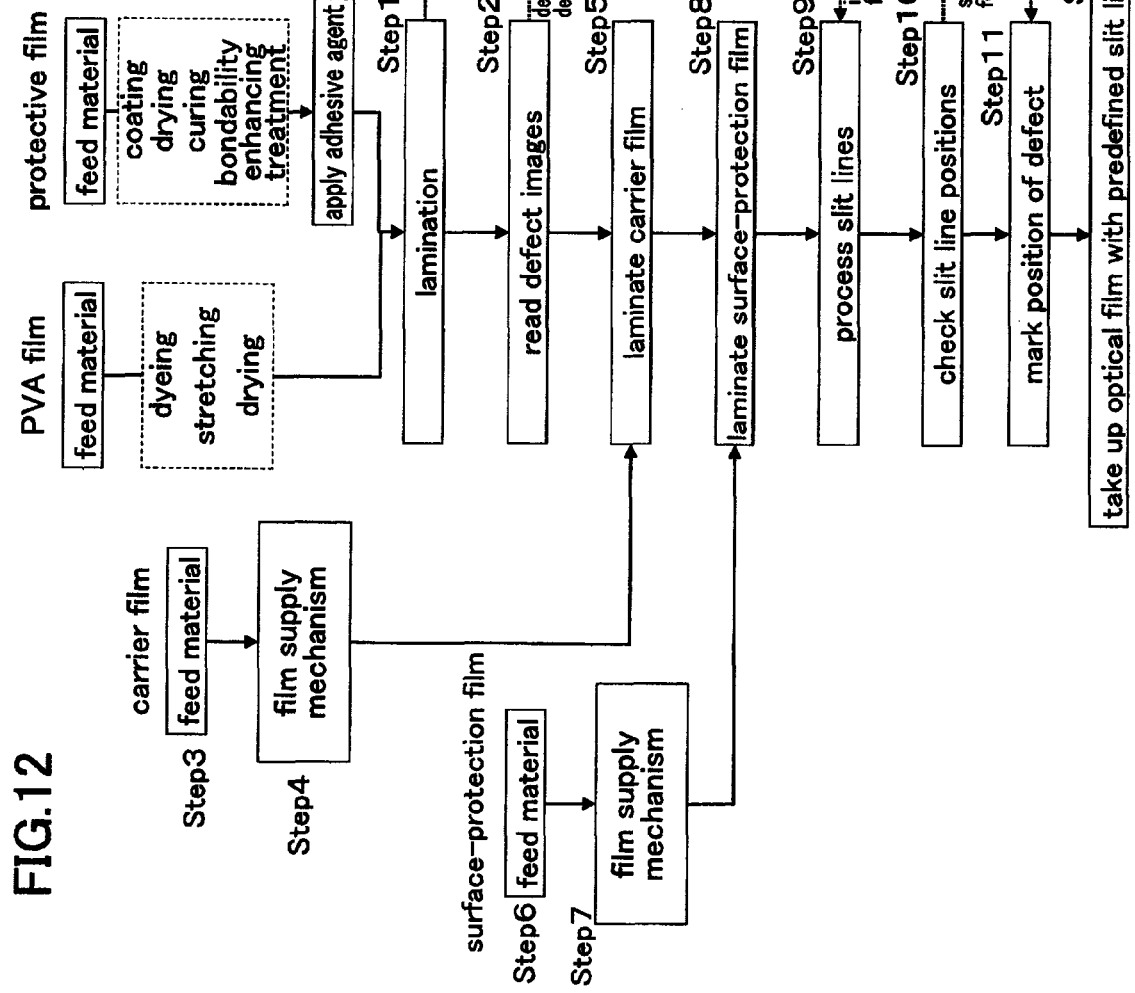
FIG. 12 is a flowchart showing manufacturing processes or process steps in the manufacturing system shown in FIG. 10.
Figure 13:
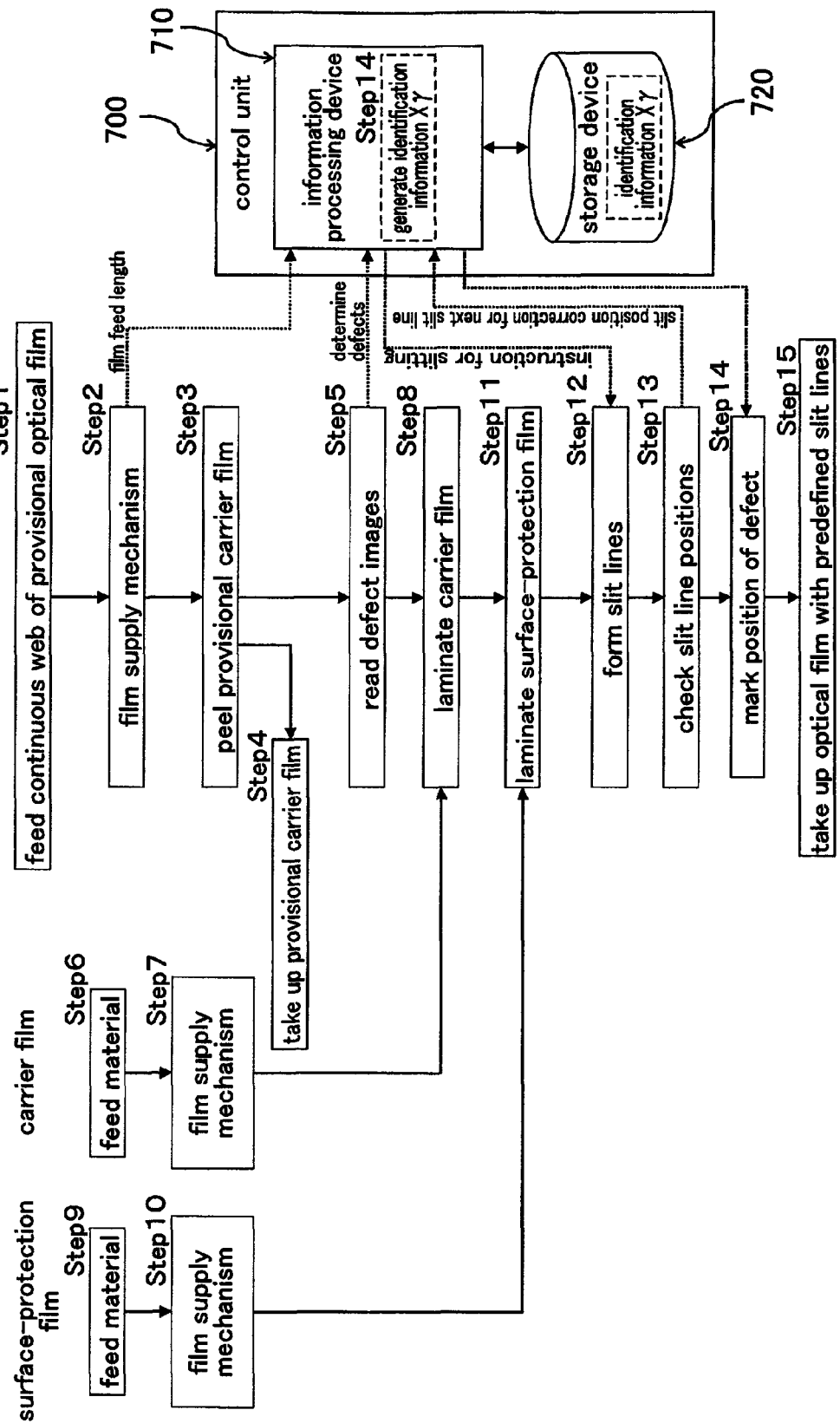
FIG. 13 is a flowchart showing manufacturing processes or process steps in the manufacturing system shown in FIG. 11.

3. Manufacturing Method and System for Continuous Web of Optical Film Laminate with Predefined Slit Lines Embodiments for a roll of the continuous web of an optical film laminate with predefined slit lines according to the present invention, and, the method and a system for manufacturing the same will be described below with reference to the related figures. FIGS. 10 and 11 show manufacturing methods and systems for a roll of a continuous web of an optical film with predefined slit lines 10, according the first and the second embodiments of the present invention respectively. FIGS. 12 and 13 show respective manufacturing processes or process steps in the manufacturing methods and systems shown in FIGS. 10 and 11.

(Manufacturing Method and System of a Roll of Continuous Web of Optical Film with Predefined Slit Lines According to the First Embodiment)

FIG. 10 shows the manufacturing system 500 according the first embodiments of the present invention. The system 500 comprises a polarizer manufacturing line 510 for continuously producing a web of a polarizer (hereinafter referred to as "polarizer" as in the previous description), a protective film manufacturing line 520 for producing a protective film to be laminated on the polarizer, and a polarizing composite film manufacturing line 530 for producing a continuous web of a polarizing composite film without adhesive layer 11° consisting of the polarizer and the protective film laminated thereon. The manufacturing line 530 further comprises an inspection station M for the polarizing composite film without adhesive layer 11° where surfaces and inside of the polarizing composite film without adhesive layer 11° are inspected to detect position or positions of a defect or defects existing in the polarizing composite film without adhesive layer 11°.

The manufacturing system 500 further comprises a manufacturing line 540 for producing a continuous web of an optical film laminate 15 by releasably laminating the carrier film 13 and the surface-protection film 14 on the inspected polarizing composite film without adhesive layer 11°. The manufacturing system 500 further comprises a slit-forming station N for sequentially forming slit lines 16 in the continuous web of the optical film laminate 15 to extend in the transverse direction of the continuous web of the optical film laminate 15 and a slit position checkup station P for checking the position of slit lines 16 formed on the continuous web of the optical film laminate 15. By forming the slit lines 16 at the slit-formation station N, the finished continuous web of the optical film laminate 15 is obtained. In an embodiment where a mark is used as identification means to identify the defective polarizing sheets Xβ, the system 500 further comprises a marking unit 545 for marking a position of detected defect. The manufacturing system 500 may also comprise, at a final stage, a manufacturing line 550 for taking up the manufactured continuous web of the optical film with slit lines 10 into a roll. FIG. 12 is a flowchart showing manufacturing processes or process steps in the manufacturing system shown in FIG. 10.

The polarizer manufacturing line 510 handles a roll of PVA-based film which is adapted to provide the substrate of the polarizer and is mounted thereon in a rotatable manner. The line 510 includes a sub-line for subjecting the PVA-based film to processes of dyeing, cross-linking, stretching and then drying while the film is being unrolled from the roll and passed through the line 510 by means of a lamination drive mechanism 560 or other drive mechanism (not shown). The protective film manufacturing line 520 handles a rotatably mounted roll of a transparent TAC-based film providing the substrate of the protective film, and includes a sub-line for subjecting the transparent TAC-based film unrolled from the roll by means of a lamination drive mechanism 560 or other drive mechanism (not shown), to a saponifying treatment followed by drying. In case where two protective films are laminated on the opposite surfaces of the polarizer, the present manufacturing system 500 may include two protective film manufacturing lines 520, 520' (the protective film manufacturing line 520' is omitted in the drawing). Further, the protective film manufacturing line 520 may additionally include a treatment sub-line for, before a protective film is laminated to the polarizer, subjecting the surface of the protective film (non-laminated surface) to a hard coat treatment or anti-glare treatment.

The polarizing composite film without adhesive layer 11° manufacturing line 530 includes a sub-line for applying an adhesive consisting primarily of a polyvinyl alcohol-based resin to an interface between the polarizer and the protective film, and drying the adhesive to bond them together through an adhesive layer having a thickness of only several μm (step 1 in FIG. 12). The manufacturing line 530 further comprises a lamination drive mechanism 560 including a pair of lamination rollers 561, and in one of the pair of lamination rollers 561, a length or distance measurement device 570 having an encoder incorporated therein, and a fed-length of the polarizing composite film without adhesive layer 11° fed out from the lamination drive mechanism 560 is measured by means of the device 570.

At the inspection station M, an inspection process for detecting defects in the polarizing composite film without adhesive layer 11° is performed by inspecting the surface and inside of the transported continuous web of the polarizing composite film without adhesive layer 11°. In the inspection process, an image from an image reading device 581 and a feed length of the polarizing composite film without adhesive layer 11° from the leading edge from a length measurement device 570 are used to generate a position information of a defect or defects detected in the inspection process, and the position information is then stored in the storage device 720 (step 2 in FIG. 12). Based on the position information of defects detected in the inspection process, identification means to identify a normal polarizing sheet Xα and a defective polarizing sheet Xβ in the system 1 for sequentially manufacturing liquid-crystal display elements is generated (step 11 in FIG. 12). The details of generating identification means based on the position information of defects are common in the first and the second embodiments, so that it will be described later in connection with reference to FIG. 15. An inspected polarizing composite film without adhesive layer 11° is obtained by the manufacturing line 530.

The manufacturing line 540 comprises a carrier film lamination unit 590 for releasably laminating the carrier film 13 to the inspected polarizing composite film without adhesive layer 11° obtained by manufacturing line 530 and a lamination unit 640 for releasably laminating, when necessary, the surface-protection film 14 to the surface of the polarizing composite film without adhesive layer 11° opposite to the surface on which the carrier film 13 is laminated. A releasable-film take up drive mechanism 592 and an optical-film take up drive mechanism 630 function to unroll and fed the carrier film 13 from the roll of the carrier film mounted on the support rack 591 with the transferable adhesive layer 12 in exposed state (step 3 and step 4 in FIG. 12). Then, the carrier film 13 is releasably laminated on the polarizing composite film without adhesive layer 11° by the carrier film lamination unit 590, to form the optical film laminate 15 having the adhesive layer 12.

Although the descriptions have been made herein with respect to a process wherein the step of forming the adhesive layer 12 on the polarizing composite film without adhesive layer 11°, simultaneously carried out with the step of laminating the carrier film 13 on the adhesive layer 12, it is to be understood that the adhesive layer 12 may be preliminarily provided on the polarizing composite film without adhesive layer 11°. Further, the adhesive surface of the surface-protection film 14 may be additionally laminated on the surface of the polarizing composite film without adhesive layer 11° opposite to the surface one which the carrier film 13 is laminated by means of the lamination unit 640, irrespective of whether the protective film is subjected to the hard coating treatment or anti-glare treatment, before the protective film is laminated to the polarizer (step 8 in FIG. 12). The surface-protection film 14 is unrolled by the releasable-film take up drive mechanism 592 and the optical-film take up drive mechanism 630 from a roll mounted on the support rack (step 6 and step 7 in FIG. 12). In this case, the manufactured continuous web of the optical film laminate 15 has a structure having the carrier film 13 and the surface-protection film 14 laminated on respective ones of the opposite surfaces of the polarizing composite film 11.

At the slit-forming station N, a slitting unit 600 is operated to sequentially form slits with a predefined interval at a side opposite to the carrier film 13 to a depth reaching the surface of the carrier film adjacent to the adhesive layer of the continuous web of the optical film laminate 15 to form slit lines 16 (step 9 in FIG. 12). Thus, a plurality of sheets having a predefined length corresponding to a dimension of a liquid-crystal panel W having a predefined size are sequentially defined on the carrier film 13 of the optical film laminate 15 by the slit lines 16. The interval of the slit lines 16 formed on the sheets, i.e., the predefined length corresponding to the dimension of a liquid-crystal panel W, is preliminary input by a system administrator to be stored in the storage device 720.

The slit position checkup station P comprises a slit position checkup unit 610 for checking a deviation between the position of the slit line 16 actually formed and the slitting position at which the slit line 16 is to be formed (the reference position) on the continuous web of the optical film laminate 15 (step 10 of FIG. 12). The slit position checkup unit 610 comprises two image-reading devices 611, one on upstream of and one on downstream of the slitting unit 600. When there is any deviation, the slitting position or angle by the slitting unit 600 is corrected.

Figure 14:
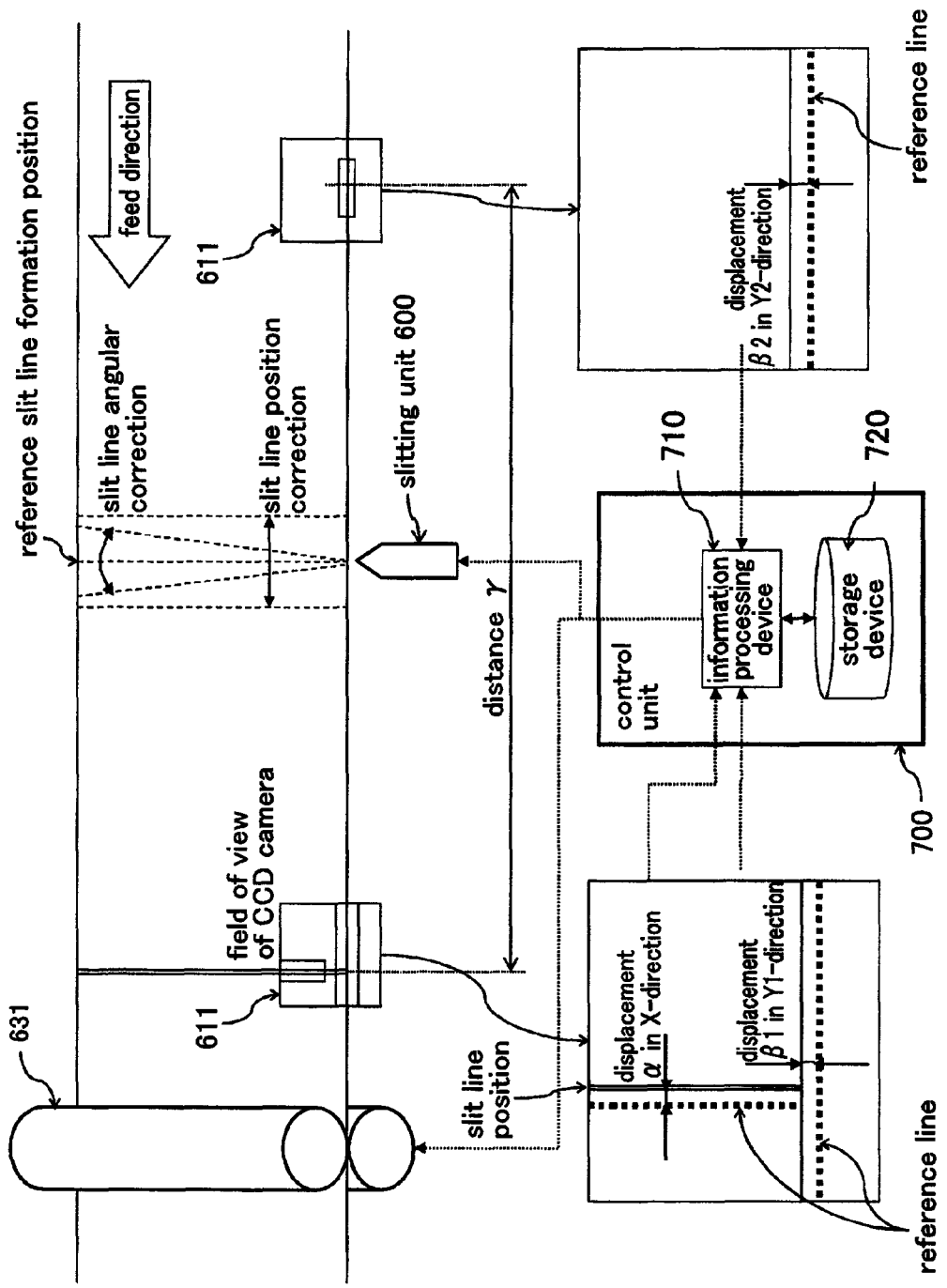
FIG. 14 is a schematic diagram showing the operation of a slit position checkup unit in the continuous manufacturing system of a continuous web of an optical film laminate with predefined slit lines, according to one embodiment of the present invention.

FIG. 14 is a schematic diagram showing an operation of the slit position checkup unit 610 together with the inspection method for checking a deviation between the position of the actually formed slit line 16 in a direction transverse to the lengthwise direction of the optical film laminate 15 and the position at which the slit line is to be formed (position of the reference slit line) on the continuous web of the optical film laminate 15, the slit line is calculated based on the feed-length measurement data obtained by the length measurement device 570 using the feed length of the optical film laminate 15.

In the slit position checkup unit 610, two image reading devices 611 are provided, one on upstream of and one downstream of the slitting unit 600 as seen in the lengthwise direction of the optical film. A pair of feed rollers 631 included in the take-up drive mechanism 630 is provided at the downstream side of the downstream image reading device 611, and a speed adjustment unit 660 including a dancer roller is provided at the upstream side of the upstream image reading device 611. By operating the above units in an inter-related manner, the continuous web of the optical film laminate 15 is constantly fed under tension even if it is temporarily stopped at the slitting position.

Coincidence of the position of the actually formed slit line 16 with the position at which the slit line 16 is to be formed (position of the reference slit line) on the continuous web of the optical film laminate 15, can be affirmed by determining the accurate positions in the lengthwise direction (X direction) and the transverse direction (Y direction) of the optical film laminate 15. One preferable way is to carry out measurements, at two locations, one on upstream of and one on downstream of the slitting position (the position of the slitting unit 600) where the slit line 16 is to be formed in the optical film laminate 15, for the deviation in X and Y directions on the position where the slit line is actually formed, the position of the edge (the side end) of the optical film laminate 15 and the position where the slit line is to be formed with respect to respective reference lines. For example, the image reading device 611 may be provided with a CCD camera to take images of the position of the actually formed slit lines in the optical film laminate 15 and the position of the edge of the optical film laminate 15 and produce picturized images. The reference lines corresponding to the actually formed slit lines and the position of the edge of the optical film are preliminarily provided in the image-taking regions, and those positions can be determined in terms of differences in contrasts in the taken images. Then, a calculation is made to determine the distance (deviation) between the predetermined reference lines and the positions of the actually formed slit-line and the edge of the optical film, and the location and the angular position of the slitting unit 600 is corrected forwardly or backwardly with respect to the lengthwise direction of the continuous web of the optical film laminate 15, based on the calculated distance (deviation).

The process for correcting the deviation between the position of the actually formed slit-line 16 on the continuous web of the optical film laminate 15 and the position where the slit-line 16 is to be formed is carried out for example in accordance with the following procedures.

(1) Images of the position (X) of the actually formed slit line 16 of the continuous web of the optical film laminate 15 and two positions (Y1, Y2) of the edge of the continuous web of the optical film laminate 15 are taken by the image reading device 611, and the images are picturized for measurement of the position of the actually formed slit line 16 (X) of the continuous web of the optical film laminate 15 and the positions of the edges (Y1, Y2) of the continuous web of the optical film laminate 15 in terms of the differences in contrast.

(2) There is a slit line reference position in the form of a line extending in Y direction at a position intermediate a reference line extending in Y direction at an upstream position as seen in X direction in the imaging area of one of the image reading devices 611 and another reference line extending in Y direction at a downstream position as seen in X direction in the imaging area of the other of the image reading devices 611, and data y representing the distance between the upstream and downstream reference lines is preliminarily stored in the storage device 720. Furthermore, there are upstream and downstream reference lines extending in the X direction in respective ones of the image-taking regions of the image reading devices 611.

(3) A correction value α for correcting in the X direction the position of the slit line 16 to be formed in accordance with the slit position information, and a correction value δ for angularly correcting in Y direction the position of the slit line 16 are calculated based on the measured positions of the actually formed slit line 16 (X) and the edge (Y1, Y2) of the continuous web of the optical film laminate 15 and the reference lines. The correction value α correspond to the measured deviation α, or the deviation α between the actual slit-line 16 position (X) and the downstream side reference line extending in the Y direction. The correction value δ can be calculated according to the following formula, based on the deviations in Y direction of the edge of the continuous web of optical film laminate 15 at two positions, or the deviations (β1, β2) of the edge of the continuous web of the optical film laminate with respect to respective ones of the upstream and downstream reference lines extending in the X direction, and the distance data γ between the two reference lines.

$$\delta = \cos^{-1}\left\{ \frac{\gamma}{\sqrt{\gamma^2 + (B_1 - \beta_2)^2}} \right\} \quad \text{[Equation 1]}$$

(4) The storage device 720 is used to store correction values (α, δ) for applying an instruction to the slitting unit 600 to perform an angular position correction by a value δ and a positional correction by value α in the X direction based on the measured and calculated data so as to make the slit line conform to the reference line of the position where the slit line 16 is to be formed extending in the Y direction.

(5) The slitting unit 600 receives instruction from the control unit 700 for the next operation of forming a slit line 16 in the continuous web of the optical film laminate 15 to perform a positional correction in the lengthwise direction and an angular position correction in a transverse direction with respect to the lengthwise direction, based on the stored correction values (α, δ) so as to conform to the reference line of the position where the slit line 16 is to be formed in the continuous web of the optical film laminate 15.

(6) Thereafter, the slitting unit 600 operates to form a next slit line in the continuous web of the optical film laminate 15.

In an embodiment where a mark is used to indicate a position of defect, a mark is provided by the marking unit 545 at positions of the defects on the optical film laminate with predefined slit lines 10 after forming and checking positions of the slit lines 16 (step 11 in FIG. 12). The optical film laminate 15 may be marked before forming the slit lines 16. The position of marking may be that a coordinate in the lengthwise direction and in the transverse direction with respect to the lengthwise direction of the optical film laminate 10 is the same or substantially same with the position of a defect, or, a coordinate in a lengthwise direction of the optical film 10 is the same or substantially same with the position of a defect (i.e. any position between the position of the defect and the edge of the optical film laminate, in the transverse direction of the optical film with respect to the lengthwise direction). A shape of mark is not specifically limited as long as detection of a provided mark is assured in the system 1 for sequentially manufacturing liquid-crystal display elements.

A continuous web of an optical film laminate with predefined slit lines 10 is obtained by forming the slit lines 16 and checking the position of the slit lines 16. The manufacturing system 500 includes a take-up drive mechanism 630 including a pair of feed rollers 631 that winds a continuous web of an optical film laminate with predefined slit lines 10 into a roll 620 (step 12 in FIG. 12).

In the first embodiment, the polarizing composite film 11 having the adhesive layer 12 may also be manufactured by directly applying a solvent containing an adhesive to the surface of the inspected polarizing composite film without adhesive layer 11° which is to be laminated to the liquid-crystal panel W, then drying the polarizing composite film. However, generally, the polarizing composite film 11 having the adhesive layer 12 is manufactured as follows. In a manufacturing process of the carrier film 13, one surface of the carrier film 13 to be laminated to the surface of the polarizing composite film 11° that is to be laminated to the liquid-crystal panel W is subjected to a releasing treatment, and then a solvent containing an adhesive is applied to the treated surface and dried to form a carrier film 13 having the adhesive layer 12. In the carrier film lamination process in the manufacturing line 540, the carrier film 13 having the preliminarily formed adhesive layer 12 is laminated to the inspected polarizing composite film without adhesive layer 11° by the lamination unit 590 so that the adhesive layer 12 formed on the carrier film 13 can be transferred to the inspected polarizing composite film without adhesive layer 11° to produce a polarizing film 11 having the adhesive layer 12. It is understood that the manufacturing line 540 may include a surface-protection film lamination process in which the surface-protection film 14 is laminated to the surface of the inspected polarizing composite film without adhesive layer 11° opposite to the surface on which the carrier film 13 is laminated by the lamination unit 640.

(Manufacturing Method and System of a Roll of Continuous Web of Optical Film with Predefined Slit Lines According to the Second Embodiment)

FIG. 11 shows a manufacturing system according to the second embodiment. The units and devices in the manufacturing system 500' shown in FIG. 11 corresponding to those of the manufacturing line 500 shown in FIG. 10 are designated by the same reference numerals. FIG. 13 is a flowchart showing manufacturing processes or process steps carried out in the manufacturing system shown in FIG. 11. A feature of the manufacturing system 500' according to the second embodiment is that a preliminarily manufactured continuous web of a provisional optical film laminate 15' is prepared. Thus, unlike the manufacturing system 500, the manufacturing system 500' does not comprise a manufacturing line for polarizer or a manufacturing line for a surface-protection film. Also, unlike the manufacturing process 530 in the first embodiment, it is not necessary to include a process of applying an adhesive agent to the interface between the polarizer and the protective film, and drying the adhesive to bond them together by the pair of lamination rollers 561 comprised in the lamination drive mechanism 560. An equivalent line to the manufacturing line 530 is the supply line 530' of the continuous web of the provisional optical film laminate 15' as shown in FIG. 11. The supply line 530' comprises a film supply mechanism 560' that includes a pair of feed rollers 561' for feeding a roll 510' of the continuous web of the provisional optical film laminate 15' mounted on the support rack 520'.

The manufacturing system 500', as shown in FIG. 11, comprises the supply line 530' for supplying the continuous web of the polarizing composite film 11 having the adhesive layer 12. The supply line 530' corresponds to the manufacturing line 530 for manufacturing the continuous web of the polarizing composite film 11 having the adhesive layer 12, so it is referred to as the "manufacturing line 530' hereinafter. The manufacturing line 530' includes an inspection station M that is similar to the inspection station M included in the manufacturing system 500 in the first embodiment, and the inspection station M in manufacturing line 530' is different from the one in the manufacturing system 500 in that the inspection target is the polarizing composite film 11 having the adhesive layer 12. The manufacturing system 500' further comprises the manufacturing line 540 and the manufacturing line 550, as the manufacturing system 500 in the first embodiment. Therefore, the manufacturing system 500' comprises the following units and devices that are common in the manufacturing system 500 in the first embodiment: an inspection unit 580 that includes an image reading device 581, a carrier film lamination unit 590 that includes a support rack 591 to which a roll of the carrier film 13 is provided, a slit position checkup unit 610 at a slit-position checkup station P which includes the image reading devices 611, a take-up drive mechanism 630 that includes a pair of feed rollers which winds the manufactured continuous web of the optical film with predefined slit lines 10, and a control unit 700 that includes a continuous information processing device 710 and a storage device 720. The manufacturing system 500' may further comprises a lamination unit 640 of a surface-protection film when necessary. In an embodiment where a mark is used as identification means to identify the defective polarizing sheets Xβ, the system 500' further comprises the marking unit 545 for making a position of a detected defect. The unit comprised in the manufacturing system 500' but not in the manufacturing system 500 in the first embodiment is a provisional carrier film take-up drive mechanism 650 that includes the provisional carrier film peeling unit 651 provided in the peeling station L.

Figure 2:
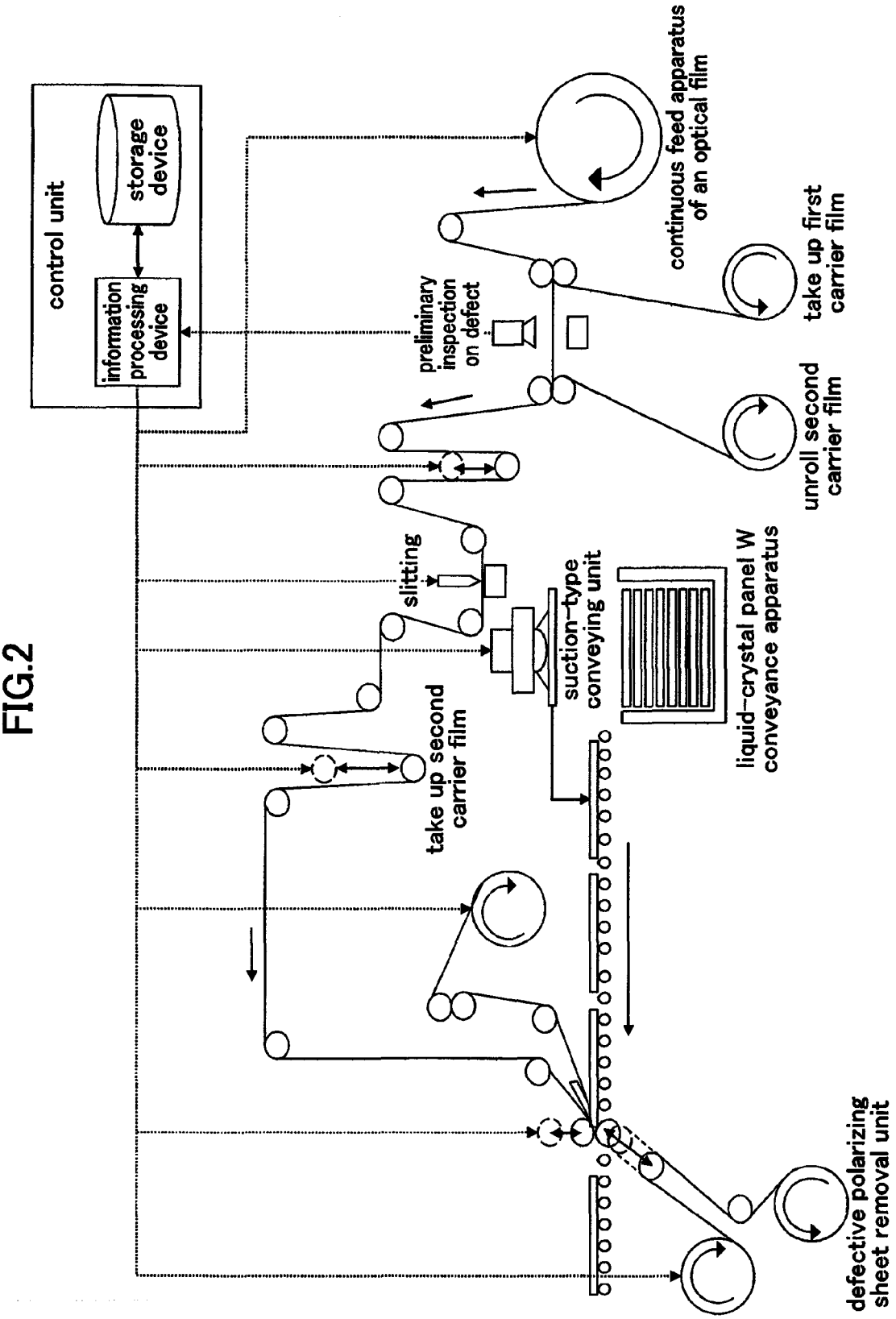
FIG. 2 is a conceptual diagram showing a system for continuously manufacturing liquid-crystal display elements wherein defect-free sheets of an optically functional film are formed and laminated on liquid-crystal panels through inspection of defects in the optically functional film, without interrupting the feed of the continuous web of the optically functional film being fed.

In the manufacturing system 500', a roll 510' of a preliminarily prepared provisional optical film laminate 15' is mounted on a support rack 520'. The provisional optical film laminate 15', for example, comprises a polarizing composite film 11 including a polarizer having a protective film laminated to one or each of opposite surfaces of the polarizer, and a provisional carrier film 13' formed with a transferable adhesive layer 12 and laminated to the polarizing composite film 11. It is preferable to use a provisional carrier film 13' including a transferable adhesive layer for manufacturing the provisional optical film laminate 15' in the manufacturing process, since the adhesive layer of the provisional carrier film 13' is transferred to the polarizing composite film 11 when peeling the provisional carrier film 13' from the provisional optical film laminate 15', to manufacture the polarizing composite film 11 having the adhesive layer 12. The provisional optical film laminate 15' is fed to the peeling station L of the manufacturing line 530' for manufacturing the polarizing composite film 11 having the adhesive layer 12 by the film supply mechanism 560' that includes a pair of feed rollers 561' (step 1 and step 2 in FIG. 13). The film supply mechanism 560' includes a pair of feed rollers 561', and the length measurement device 570 having an encoder incorporated therein is provided on one of the pair of feed rollers 561' for measuring a feed length of the provisional optical film laminate 15' delivered from the film supply mechanism 560' (step 2 in FIG. 2). In the peeling station L, the provisional carrier film 13' is peeled and removed from the provisional optical film laminate 15' by the provisional-carrier-film peeling unit 651 in the provisional carrier film take-up drive mechanism 650 (step 4 in FIG. 13), and the polarizing composite film 11 with the transferred adhesive layer 12 is manufactured.

In the inspection station M, similarly as in the first embodiment, the inspection unit 580 is used to inspect the surface and inside of the continuous web of the polarizing composite film 11 having the exposed adhesive layer 12 to detect defects.

In the inspection process, the control unit 700 produces position information representing locations of a defect or defects in the polarizing composite film 11 having the adhesive layer using the image data from the image reading device 581 and the feed-length measurement data based on the delivered length measured by the length measurement device 570 as a length from the leading edge of the polarizing composite film 11 having the adhesive layer 12, so as to, and the position information is then stored in the storage device 720 (step 5 in FIG. 13). Based on the positions of defects detected at the inspection process, identification means to identify the defective polarizing sheets Xβ and the normal polarizing sheets Xα is generated for the system 1 for sequentially manufacturing liquid-crystal display elements (step 14 in FIG. 13).

The manufacturing line 540 comprises the carrier film lamination unit 590 for releasably laminating the carrier film 13 to the inspected polarizing composite film 11 having the adhesive layer manufactured in the manufacturing line 530', and the lamination unit 640 for releasably laminating the surface-protection film 14 to the surface of the polarizing composite film 11 opposite to the surface on which the carrier film 13 is laminated when necessary. The carrier film 13 is releasably laminated on the polarizing composite film 11 having the adhesive layer 12 by the carrier-film lamination unit 590, wherein the surface of the carrier film 13 to be laminated is subjected to a releasing treatment, to form the continuous web of the optical film laminate 15.

It may be possible to releasably laminate a surface-protection film 14 having an adhesive surface on the surface of the polarizing composite film 11 opposite to the surface on which the carrier film 13 is laminated by means of a lamination unit 640, before the protective film is laminated to the polarizer, irrespective of whether the protective film is subjected to a hard coat treatment or anti-glare treatment on one surface. In this case, the resulting continuous web of the optical film laminate 15 has a structure where the carrier film 13 and the surface-protection film 14 are releasably laminated to respective ones of the opposite surfaces of the polarizing composite film 11 having the adhesive layer 12. The manufactured continuous web of the optical film laminate 15 has the same structure as the continuous web of the optical film laminate 15 manufactured in the manufacturing system 500 in the first embodiment.

The manufactured continuous web of the optical film laminate 15 is subjected to slit line forming, slit line position checking and correcting, and marking the defect position when necessary to obtain the finished continuous web of the optical film laminate with predefined slit lines 10, similarly as in the system 500 according to the first embodiment.

(Generating Identification Means for Defective Polarizing Sheet)

Figure 15:
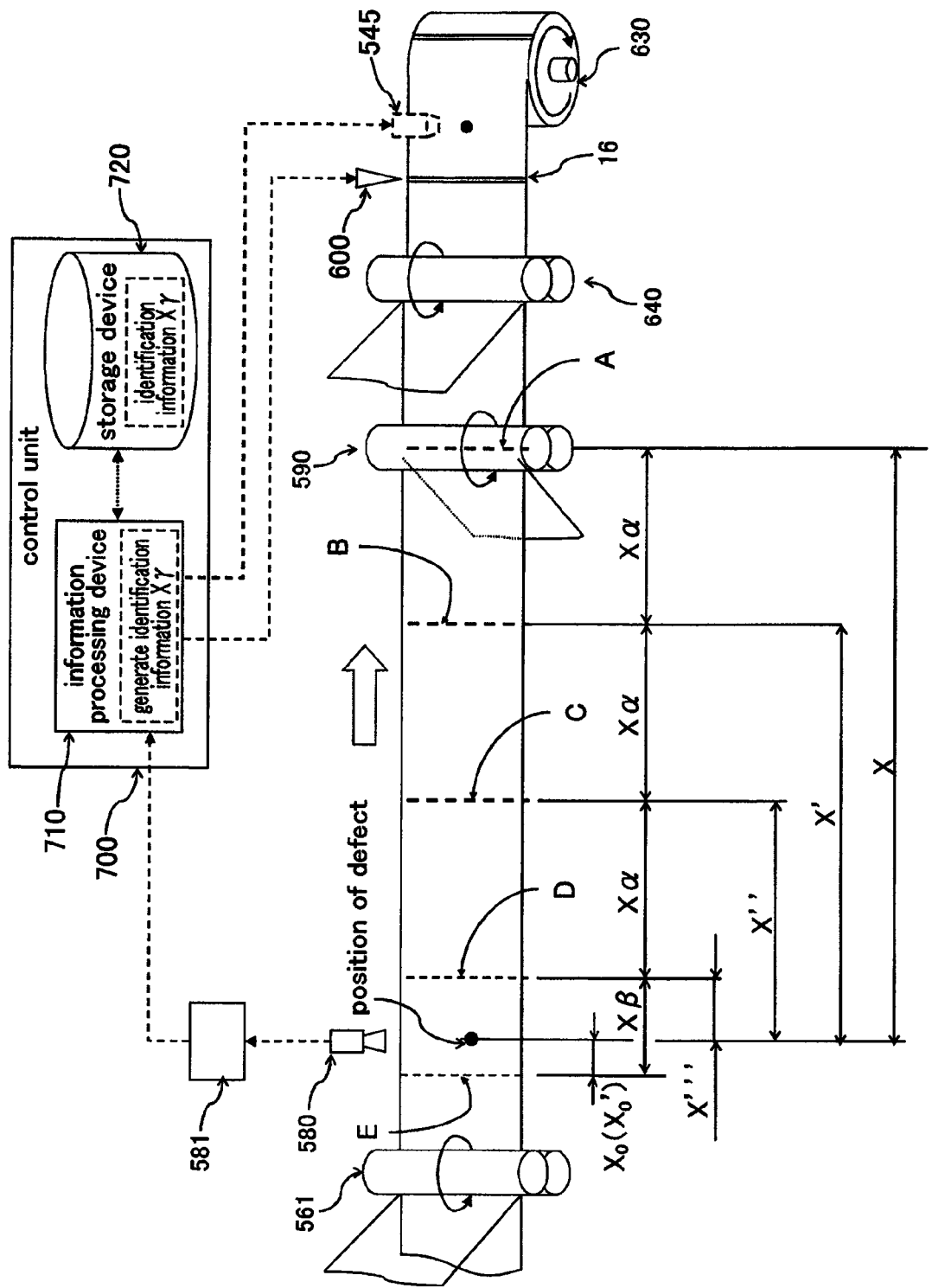
FIG. 15 is a schematic diagram showing forming a slit line in a continuous web of an optical film laminate and forming identification means for identifying the defective polarizing sheets.

In either of the first or the second embodiment, the control unit 700, connected with the inspection unit 580, at the inspection station M, generates identification means to identify a defective polarizing sheet Xβ and a normal polarizing sheet Xα for the system 1 for sequentially manufacturing liquid-crystal display elements, based on the defect position detected by the inspection in the inspection station M. FIG. 15 is a schematic diagram showing forming a slit line in a continuous web of an optical film laminate and forming identification means of defective polarizing sheets Xβ.

In one embodiment of the present invention, the identification means is a mark indicating a defect position in the optical film laminate with predefined slit lines 10 as shown in FIG. 15, and the marked sheets are determined to be defective polarizing sheets Xβ in the system 1 for sequentially manufacturing liquid-crystal display elements. Marking is performed as follows. The delivered polarizing composite film 11 is subjected to a defect inspection by the inspection unit 580. In the inspection process, an image of a defect from the image reading device 581 and a feed length of the polarizing composite film 11 from the leading edge from the length measurement device 570 are used to calculate the defect position in the polarizing composite film 11 and the defect position information is then stored in the storage device 720. Subsequently, the slitting unit 600 forms the slit lines 16 on the optical film laminate 15 laminated with the carrier film 13 and, when necessary, the surface-protection film 14, and the position of the slit lines 16 is checked, then, the optical film laminate 15 is marked by the marking unit 545 based on the defect position information stored in the storage device 720. The optical film laminate 15 may be marked before forming the slit lines 16. In the present invention, since the slit lines 16 are formed at an interval equivalent to a predefined size of the liquid-crystal panel W irrespective of the defect, a defect may exist in the position that a slit line is to be formed. In this case, two sheets, one immediately upstream of the defect position and the other immediately downstream of the defect position, are marked to be identified as the defective polarizing sheets Xβ.

Figure 16:
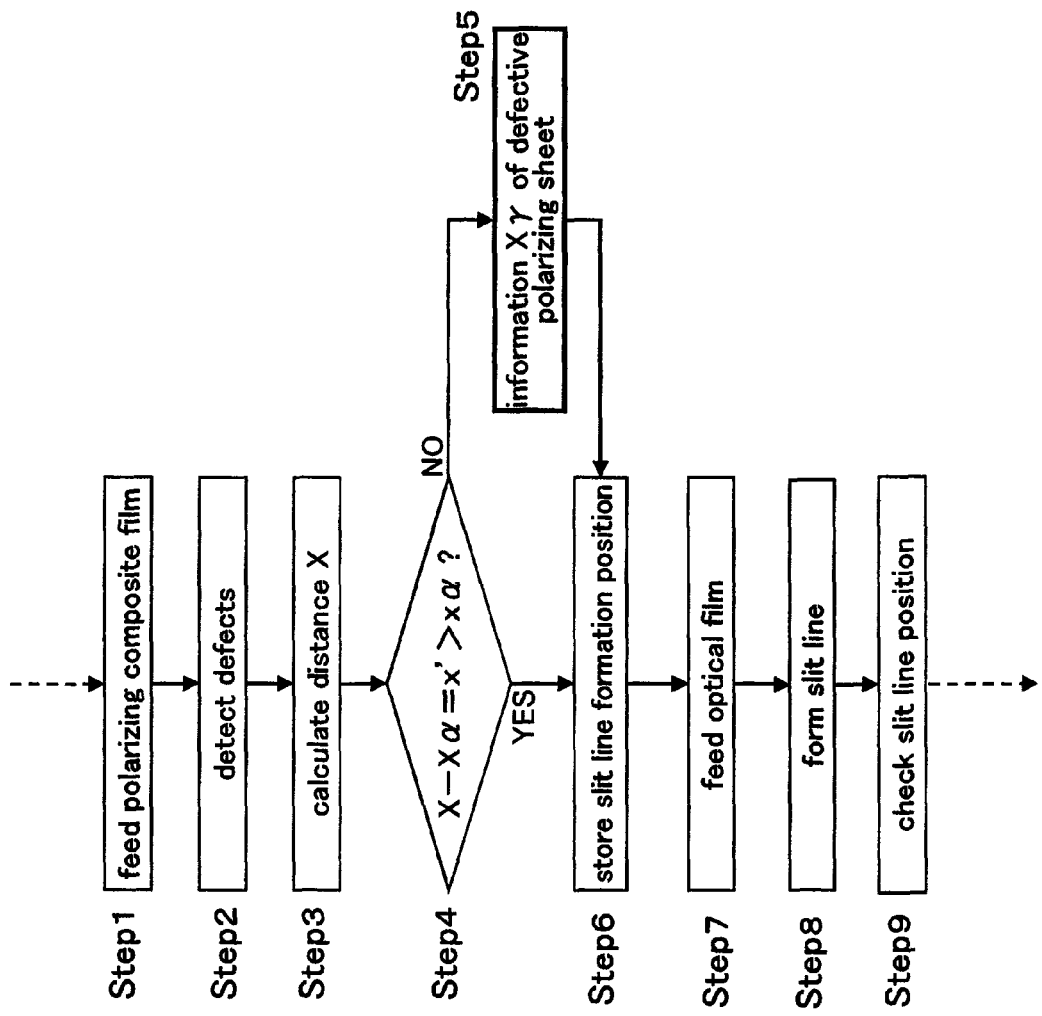
FIG. 16 a schematic diagram showing an embodiment comprising a step for generating identification information for defective polarizing sheets in the continuous manufacturing system of a continuous web of an optical film laminate with predefined slit lines, according to one embodiment of the present invention.
Figure 17:
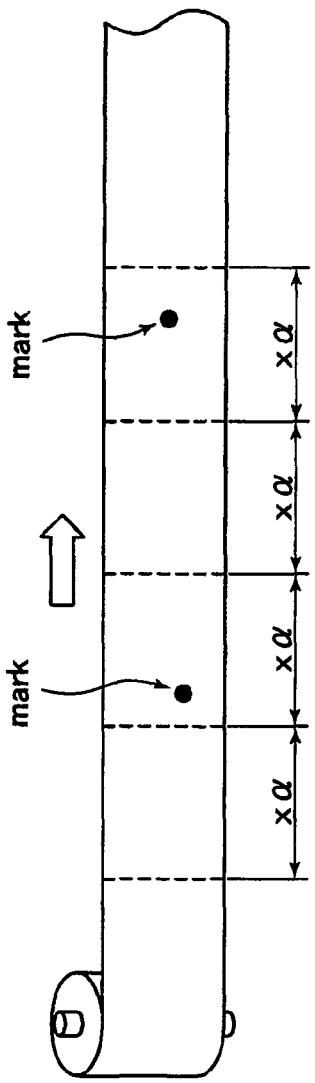
FIG. 17 is a schematic diagram showing an example of identification information of defective polarizing sheets.

In another embodiment of the present invention, the identification means is in the form of identification information Xγ configured to indicate which is a defective polarizing sheet Xβ or a normal polarizing sheet Xα among the plurality of sheets being included in the optical film laminate with predefined slit lines 10. A method for generating the identification information Xγ will be described below with reference to FIG. 15 to FIG. 17. FIG. 16 a schematic flow diagram showing a step of feeding a polarizing composite film to checking slit line position and a step of generating the identification information Xγ, and FIG. 17 is a schematic diagram showing an example of the identification information Xγ generated based on a defect position. It should be noted that the method is merely an example of a method for generating the identification information Xγ.

In the step 1, the polarizing composite film 11 is fed for a defect inspection in the inspection station M. In the step 2, a defect position in the polarizing composite film 11 is calculated using the image data from the image reading device 581 and the feed length measurement data based on the fed length measured by the length or distance measurement device 570 as a length from the leading edge of the polarizing composite film 11. In the step 3, a length X between a position of a defect of the polarizing composite film 11 being fed and the reference position is calculated. As shown in FIG. 15, the length X is a distance, for example, between the position of the inspection unit 580 (a position of defect) and the position of the carrier film lamination unit 590 (the reference position of the polarizing composite film 11 (the position A in FIG. 15)).

In the step 4, the length xα corresponding to that of the normal polarizing sheet Xα is subtracted from the length x to obtain a length (x−xα)=x', and the length x' and the length xα are compared. The length xα corresponding to that of the normal polarizing sheet Xα of the polarizing composite film 11 is determined by a system administrator based on the size of the liquid-crystal panel W and pre-stored in the storage device 720. If a relation x'>xα is established, it is understood that the normal polarizing sheet Xα of the polarizing composite film 11 can be secured. The position B in this relation is the next slitting position. The data of the position B is stored in the storage device 720 (step 6), and the polarizing composite film 11 is delivered under tension by the length xα of the normal polarizing sheet (step 7). Then, the steps 1 to 7 are repeated, and the data of the slitting position C and D are stored in the storage device 720.

To the contrary, if a relation x'≦xα, i.e., x''' in FIG. 15 ≦xα is established, it is impossible to provide a normal polarizing sheet Xα of the polarizing composite film 11 cannot be secured. In this case, the identification information Xγ is generated for identifying the normal polarizing sheet Xα and the defective polarizing sheet Xβ in the system 1 for sequentially manufacturing liquid-crystal display elements (step 5). The identification information Xγ may be a value "0" to be associated with a position information for forming the slit line 16 corresponding to the normal polarizing sheet Xα, and a value "1" to be associated with a position information for forming the slit line 16 corresponding to the defective polarizing sheet Xβ. The identification information Xγ is stored in the storage device 720 and is subsequently transmitted to the storage device 420 of the system 1 by any means when necessary. The identification information Xγ may be stored in the storage device 420 via information storage medium such as a flexible disc, a CD-ROM, a DVD, or a flash memory, or may be directly transmitted to the storage device 420 via the Internet or a dedicated network. After generating the identification information Xγ, the data of the next slitting position E is stored in the storage device 720. The slitting position information stored in the storage device 720 is used for forming the slit lines by the slitting unit 600 on the optical film laminate 15 laminated with the carrier film 13 and, when necessary, the surface-protection film 14 (step 8), and the position of forming the slit line 16 is checked (step 9). Thus, a plurality of slit lines 16 is sequentially formed at an interval equivalent to a predefined length corresponding to the size of the liquid-crystal panel W on the optical film laminate 10 to allow identifying a sheet as a defective sheet Xβ if a defect or defects exist in the sheet defined between any two consecutive slit lines 16 of a plurality of slit lines 16. In the embodiment where the identification information Xγ is generated, similarly as in the embodiment where marking is used, since the slit lines 16 are formed at an interval equivalent to the predefined size of the liquid-crystal panel W irrespective of a defect position, a defect may exist in the position that a slit line is to be formed. In this case, two sheets, one immediately upstream of the defect position and the other immediately downstream of the defect position, are marked to be identified as the defective polarizing sheets Xβ.

(Details of Defect Inspection Unit)

Figure 18:
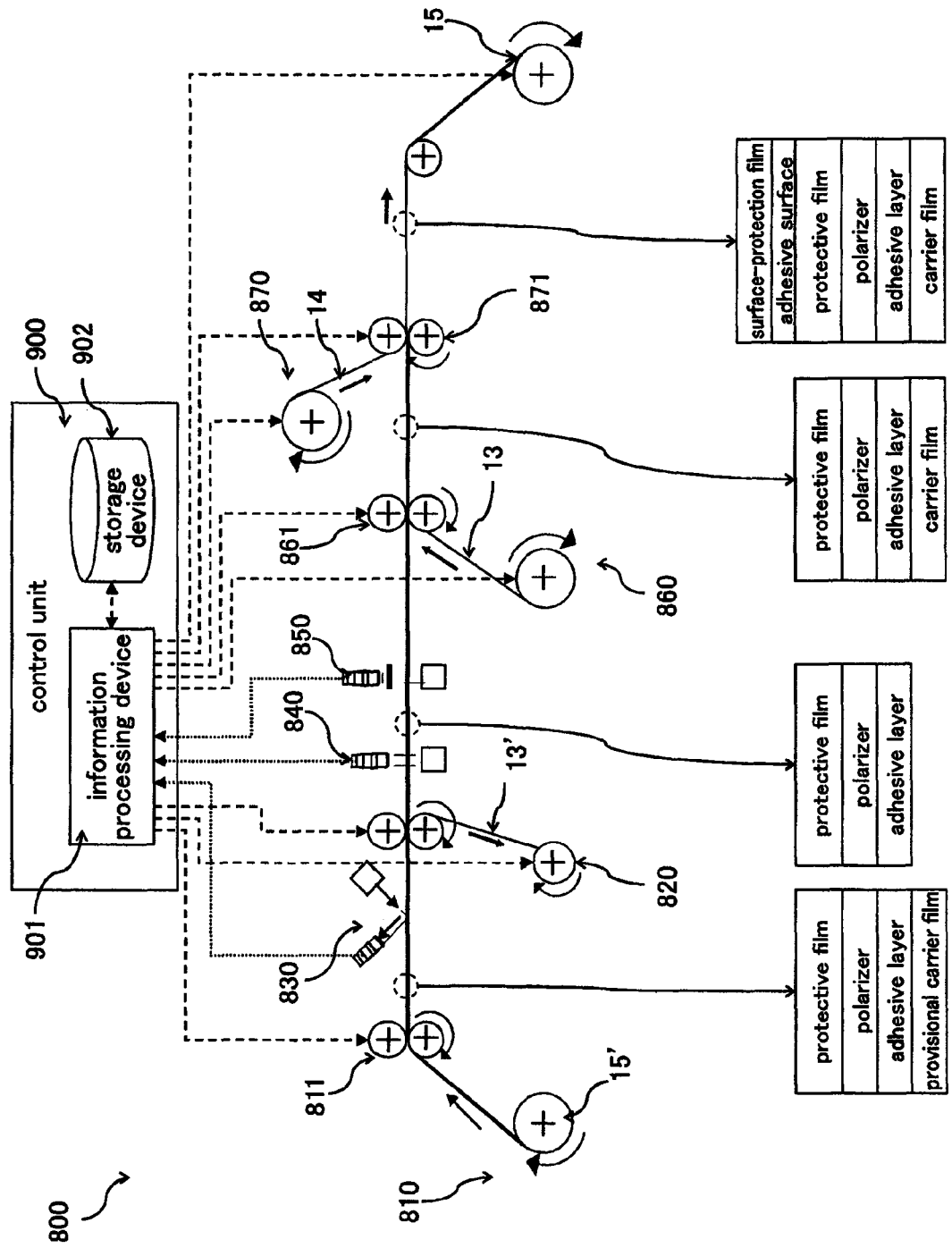
FIG. 18 is a schematic diagram showing an preferable example for detecting defects in the continuous manufacturing system of a continuous web of an optical film laminate with predefined slit lines, according to one embodiment of the present invention.

FIG. 18 shows one example of a preferable embodiment for detecting defects in a polarizing composite film having an adhesive layer according to the second embodiment of the present invention. In this embodiment, a continuous web of a provisional optical film laminate 15' is transported to the peeling station L, and a provisional carrier film 13' which is a part of the continuous web of the provisional optical film laminate 15' is peeled from the laminate to produce the polarizing composite film having the adhesive layer 12, wherein the manufactured polarizing composite film 11 having the adhesive layer 12 is inspected at the inspection station M comprising three inspection units to inspect the position of a defect or defects. It is needless to mention that the inspection units are not limited to those shown in the figure and are also applicable to the inspection unit M according to the first embodiment of the present invention. FIG. 18 further shows a manufacturing system 800 for manufacturing a roll of a continuous web of an optical film laminate 15 including a carrier film 13 releasably laminated on the polarizing composite film 11 having the adhesive layer 12 and, when necessary, the surface-protection film releasably laminated on the surface of the polarizing composite film 11 opposite to the surface on which the carrier film 13 is laminated to form the roll of the optical film laminate 15. The manufacturing line for manufacturing the continuous web of the optical film laminate 15 is described in detail in the description of the manufacturing line 500 and 500' in the first and the second embodiments, therefore, the description is omitted here.

The manufacturing system 800 comprises a film feed unit 810 including a feed roller 811 for feeding the provisional optical film laminate 15', and a take-up drive mechanism 820 for winding the provisional carrier film 13'. The manufacturing system 800 further comprises a first inspection unit 830, a second inspection unit 840, and a third inspection unit 850, the inspection units being controlled by a control unit 900 that includes an information processing device 910 and a storage device 920. There are provided a carrier film feed unit 860 including a lamination unit 861 and, when necessary, a protective film feed unit 870 including a lamination unit 871, which operate to releasably laminate the carrier film 13 to the exposed surface of the adhesive layer 12 of the inspected polarizing composite film 11 having the adhesive layer 12, and, when necessary, releasably laminate the surface-protection film to the surface of the polarizing composite film opposite to the surface on which the carrier film 13 is laminated. Thus, the continuous web of optical film laminate 15 is manufactured.

As shown in FIG. 18, the inspection units are disposed at respective three positions in the manufacturing system 800. The first inspection unit 840 is located between the feed roller 811 of the film feed unit 810 and the take-up drive mechanism 820 for winding the provisional carrier film 13', and adapted to inspect the continuous web of the provisional optical film laminate 15' to which the provisional carrier film 13' is laminated. The first inspection unit 840 inspects the surface of the polarizing composite film 11 by means of reflected light. Defects that can be inspected are defects such as uneven surface, scratches and spots on the surface which are detectable by CCD camera, as shown in FIG. 19.

The second inspection unit 840 is a transmission inspection unit that is designed such that light irradiated from a light source is projected to the polarizing composite film 11 having the adhesive layer 12 perpendicularly thereto, and to receive the light by an optical detection unit to detect one or more defects existing in the polarizing composite film 11 having the adhesive layer 12 in the form of a shade. Defects that can be inspected are defects such as foreign items or bubbles in the film.

The third inspection unit 850 is a defect inspection unit based on a crossed-Nichol condition. Along with the application of such defect inspection unit, the accuracy of the defect inspection of polarizing composite films has dramatically improved. Generally, manufacturers tend to use only the polarizing composite film that has passed the defect inspection based on the crossed-Nichol condition for large-size liquid-crystal display elements. In the inspection according to this method, a polarizing composite film 11 to be inspected is placed with respect to a polarizing filter such that their absorption axes to be oriented at a right angle. A light source is provided to inject light to the polarizing composite film 11 and the polarizing filter to examine the light transmitted therethrough. Thus, if there is any defect in the polarizing composite film 11 having the adhesive layer 12, such defect is detected as one or more bright spots. The third inspection unit 850 is designed such that the light emitted from the light source is projected to the polarizing composite film having the adhesive layer perpendicularly or obliquely thereto and, with a polarization filter being disposed immediately before the optical detection unit so as to make the absorption axis thereof being oriented at a right angle with respect to an absorption axis of the polarizing composite film 11 having the adhesive layer 12, and the light which has passed through the polarizing composite film 11 having the adhesive layer 12 is received by the optical detection unit to thereby detect any defect existing in the polarizing composite film 11 having the adhesive layer 12 as one or more bright spots. As shown in FIG. 19, all defects, except surface unevenness, are detected by the third inspection unit 850.

Although each of the first, second and third inspection units uses the polarizing composite film 11 which has the adhesive layer 12 provided thereon as the object to be inspected, it is needless to say that the polarizing composite film without the adhesive layer 11° or other optically functional film can be used as the inspected in the same way.

Although the present invention has been described in connection with preferred embodiments, it will be understood that various changes and modifications may be made by those skilled in the art without departing from the spirit and scope of the invention, defined in the following claims, and legal equivalents of the following claims may be substituted for elements thereof. Accordingly, the present invention is not limited to the specific embodiments disclosed as the best mode for carrying out the invention, but intended to cover all embodiments included within the scope thereof.

The invention claimed is:

1. A roll of a continuous web of an optical film laminate adapted for use in a system for sequentially manufacturing liquid-crystal display elements by laminating optically functional film sheets to respective ones of liquid-crystal panels, said optically functional film sheet having a predefined dimension corresponding to a dimension of the respective ones of liquid-crystal panels having a predefined size, wherein the optical film laminate comprising;
    an optically functional film with an adhesive layer including at least one defect-free normal sheet having no defect and at least one defect-containing sheet having at least one defect, the at least one defect-free normal sheet and the at least one defect-containing sheet being defined between two longitudinally adjacent ones of predefined slit lines based on a preliminary inspection and having the predefined dimension, wherein the preliminary inspection occurs prior to winding the optical film into a roll; and
    a carrier film releasably laminated on the adhesive layer,
    wherein said slit lines being sequentially formed, prior to winding the optical film laminate into the roll, in a transverse direction of said optical film laminate at a side opposite to said carrier film to a depth reaching a surface of said carrier film adjacent to said adhesive layer,
    wherein said at least one defect-free normal sheet and said at least one defect-containing sheet comprising identification means generated based on a position of defect detected by said preliminary inspection.

2. The roll of a continuous web of an optical film laminate with predefined slit lines as defined in claim 1, wherein the identification means is a mark provided to said position of defect in said optical film laminate detected by said preliminary inspection.

3. The roll of a continuous web of an optical film laminate with predefined slit lines as defined in claim 1, wherein the identification means is identification information being configured to indicate that a sheet is a defective sheet when at least one defect exists in the sheet between two longitudinally adjacent one of slit lines, based on a position of defect detected by said preliminary inspection and a position of said slit lines.

* * * * *